United States Patent [19]

Ikeda

[11] Patent Number: 5,625,269

[45] Date of Patent: Apr. 29, 1997

[54] STEPPING MOTOR CONTROL SYSTEM AND RECORDING APPARATUS USING THE SAME

[75] Inventor: Tetsuhito Ikeda, Kawasaki, Japan

[73] Assignee: Canon Kabushiki Kaisha, Tokyo, Japan

[21] Appl. No.: 447,753

[22] Filed: May 23, 1995

[30] Foreign Application Priority Data

May 24, 1994 [JP] Japan ..................... 6-133805

[51] Int. Cl.$^6$ .................................... H02P 8/00
[52] U.S. Cl. ............... 318/696; 318/685; 318/254; 318/138; 318/599; 318/439; 318/811
[58] Field of Search ................ 318/696, 685, 318/254, 138, 435, 599, 811, 798–815, 567, 569, 600; 388/804, 819, 829, 831, 907.5

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,673,855 | 6/1987 | Boilat .................. 318/696 |
| 4,723,129 | 2/1988 | Endo et al. . |
| 4,740,796 | 4/1988 | Endo et al. . |
| 5,124,625 | 6/1992 | Wakabayashi ............ 318/696 X |
| 5,378,975 | 1/1995 | Schweid et al. .......... 318/685 |
| 5,406,184 | 4/1995 | Bahn ..................... 318/696 |
| 5,434,492 | 7/1995 | Hilaire et al. ............ 318/696 |

FOREIGN PATENT DOCUMENTS

| | | |
|---|---|---|
| 0311095 | 4/1989 | European Pat. Off. . |
| 0571289 | 11/1993 | European Pat. Off. . |
| 2312170 | 8/1974 | Germany . |
| 59-123670 | 7/1984 | Japan . |
| 59-138461 | 8/1984 | Japan . |
| 6-54590 | 2/1994 | Japan . |

OTHER PUBLICATIONS

Patent Abstracts of Japan, vol. 9, No. 8 (E–289), published Jan. 12, 1985, English Abstract of Japanese Patent No. 59–156195, published Sep. 5, 1984.

*Primary Examiner*—Karen Masih
*Attorney, Agent, or Firm*—Fitzpatrick, Cella, Harper & Scinto

[57] ABSTRACT

In this invention, a stepping motor control system includes a PWM unit for generating a PWM signal corresponding to a changing duty ratio, a low-pass filter for receiving the PWM signal from the PWM unit, and converting staircase voltage levels represented by the changing duty ratio of the PWM signal into a smooth, substantially continuous voltage signal, and an arbitrary current value setting type constant current driving circuit, which receives the voltage signal from the low-pass filter, excites the excitation coil of the stepping motor by a current value set in correspondence with the voltage signal, and maintains the current value set in correspondence with the voltage of the voltage signal. Thus, a stepping motor control system which can eliminate wasteful power consumption and can realize high-precision, constant-speed rotation can be provided. When the stepping motor control system is used for driving a carriage of a recording apparatus, a recording apparatus which is free from printing nonuniformity and can achieve power saving can be provided.

16 Claims, 20 Drawing Sheets

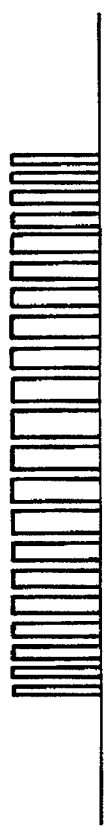
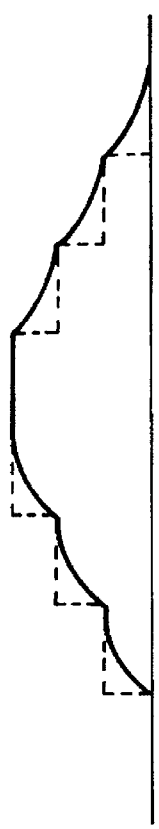
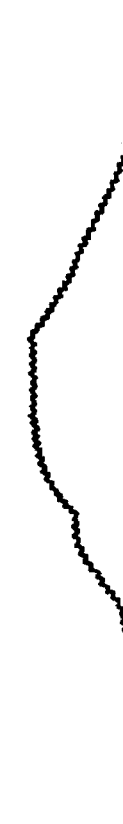
FIG. 3A  PWM SIGNAL
FIG. 3B  OUTPUT OF LOW-PASS FILTER
FIG. 3C  WINDING CURRENT
FIG. 3B'  OUTPUT OF LOW-PASS FILTER
FIG. 3C'  WINDING CURRENT FIG. 5A  A 
FIG. 5B  B 
FIG. 5C  C 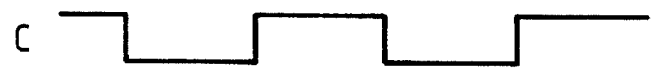
FIG. 5D  D 
FIG. 5E  E 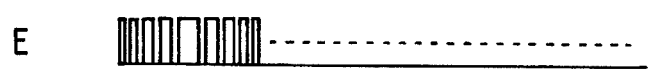
FIG. 5F  F 
FIG. 5G  OUTPUT OF LOW-PASS FILTER 104a 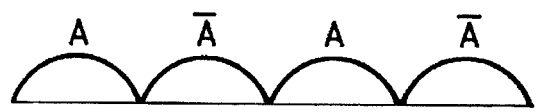
FIG. 5H  OUTPUT OF LOW-PASS FILTER 104b 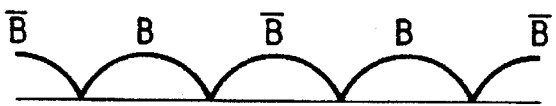

FIG. 7A  A 
FIG. 7B  B 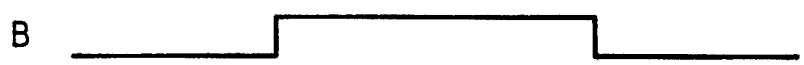
FIG. 7C  C 
FIG. 7D  D 
FIG. 8
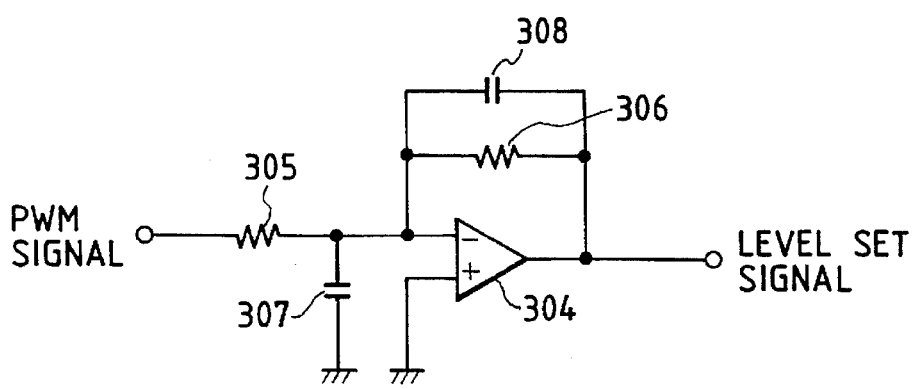

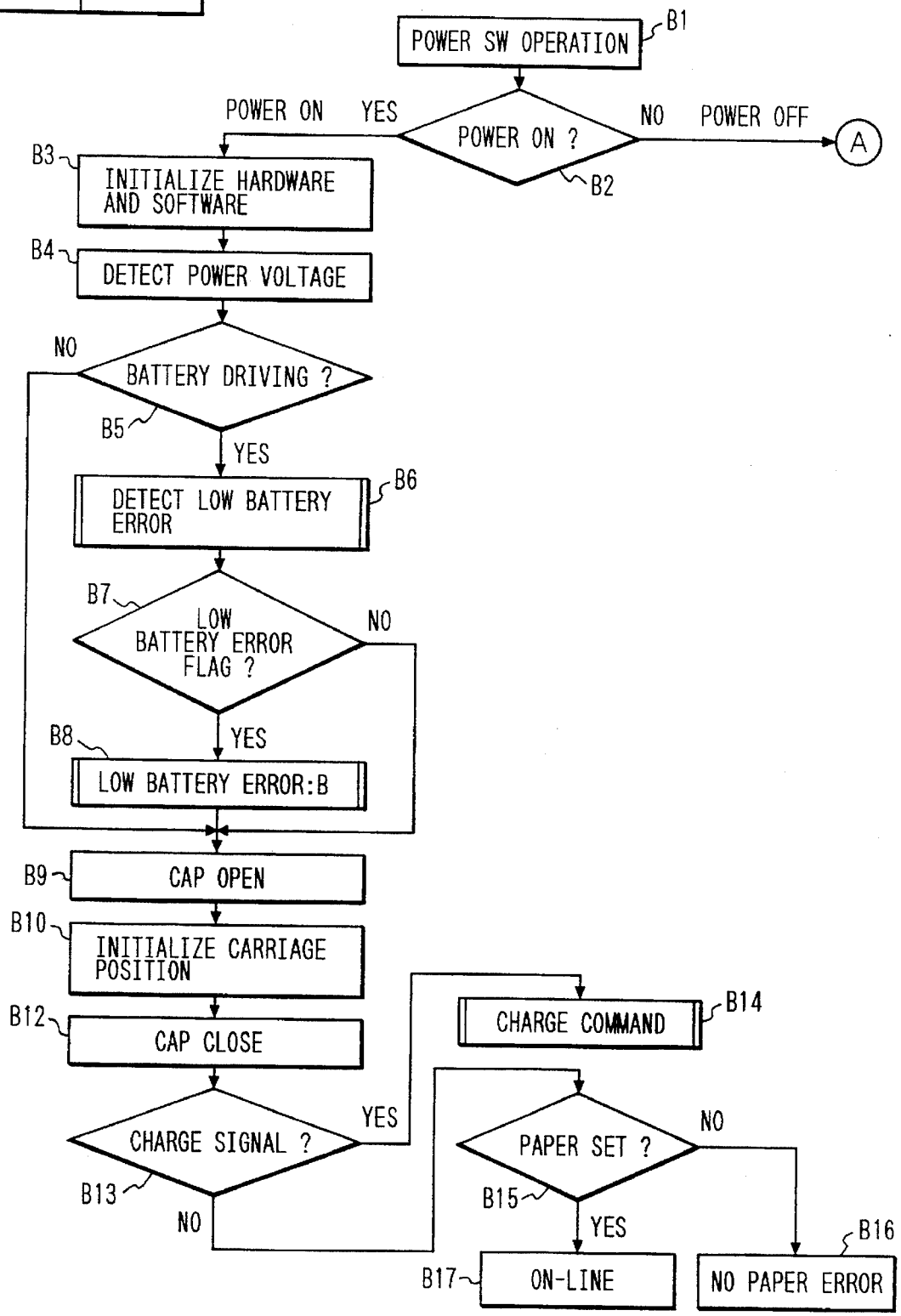

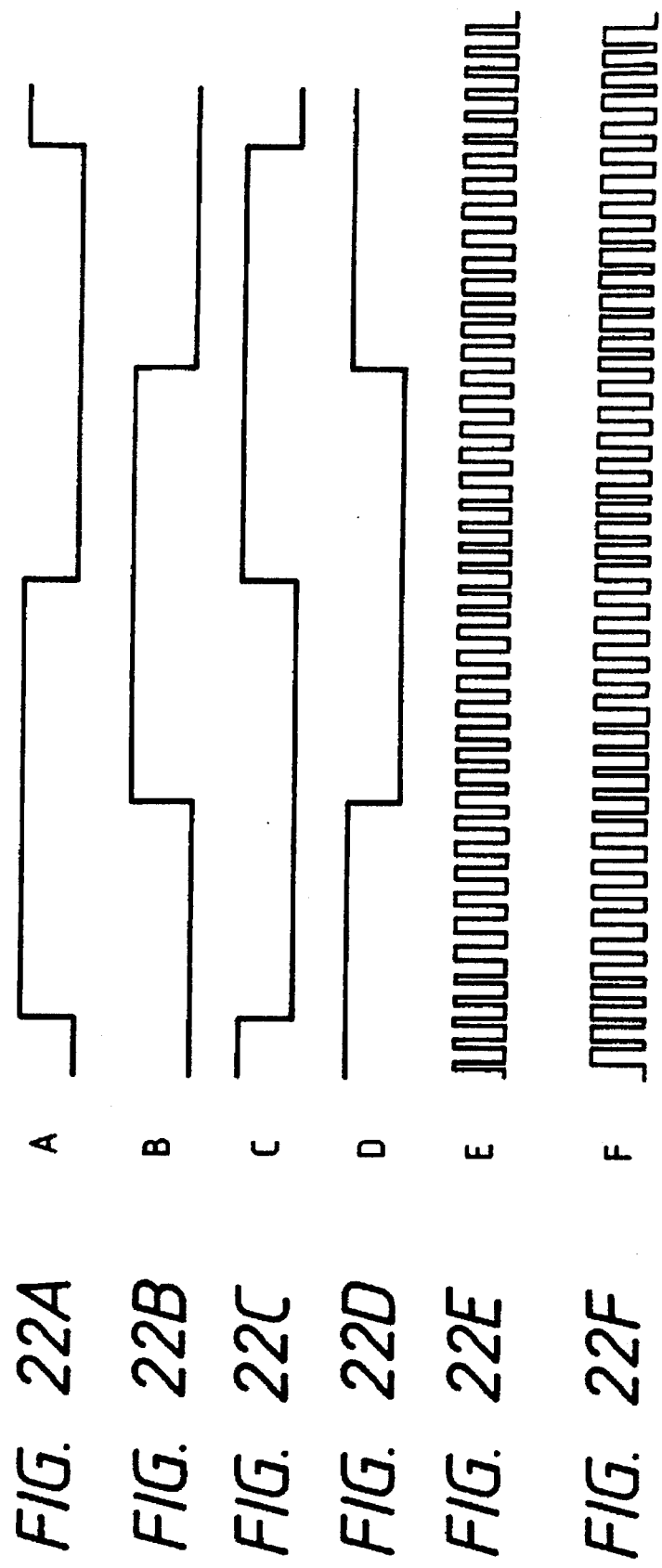

FIG. 23
| ADDRESS | ① | ② | ③ | ④ | ⑤ | ⑥ | ⑦ | ⑧ |
|---|---|---|---|---|---|---|---|---|
| DUTY | 40 | 60 | 70 | 80 | 70 | 60 | 40 | 20 |
FIG. 24A
FIG. 24B
FIG. 24C
FIG. 24D
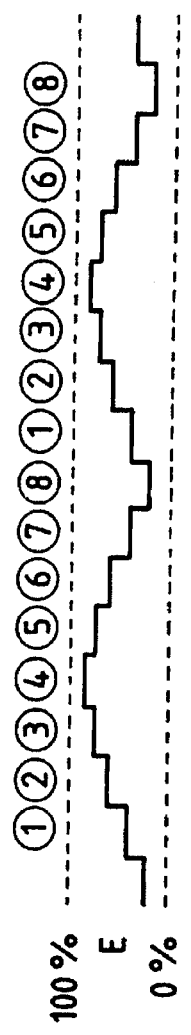
FIG. 24E
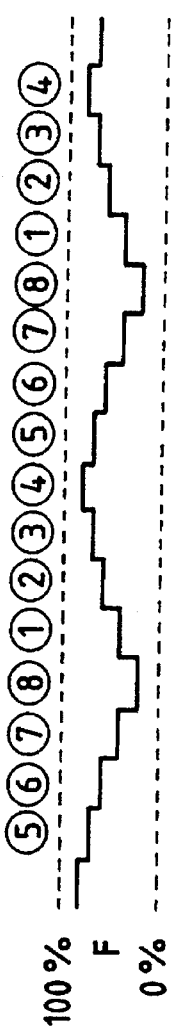
FIG. 24F

STEPPING MOTOR CONTROL SYSTEM AND RECORDING APPARATUS USING THE SAME

BACKGROUND OF THE INVENTION

1. Field of the Invention

The present invention relates to a stepping motor control system and a recording apparatus using the same.

2. Related Background Art

Conventionally, stepping motors are widely used as driving sources for industrial equipment in recent years due to their high rotational position alignment precision. In particular, stepping motors are popularly used as driving motors for so-called OA (office automation) equipment such as recording apparatuses.

As a typical control system of a stepping motor, a constant voltage driving system is known. This system requires a constant voltage circuit for preventing a variation in torque caused by a change in motor current corresponding to a change in voltage. As a result, (1) the size of the entire circuit becomes large and cost increases. Furthermore, since constant voltage driving is performed, (2) a vibration is generated in the motor, resulting in large rotation noise, and (3) electric power which is not used for driving is wastefully consumed, thus generating heat.

On the other hand, a constant current driving system is known as a driving system which is not influenced by a variation in voltage. In this constant current driving system, the value of a current flowing through a motor winding or coil is detected, and a switch element such as a transistor is pulse-width-modulation-driven so that the detected current value becomes a preset current value. The constant current driving system can solve the problem (1), but cannot solve the problems (2) and (3) due to constant current driving.

In order to solve the problems of the above-mentioned constant current driving system, the present applicant has proposed an open PWM control system in Japanese Patent Application No. 4-203863. In the open PWM control system, a driving current value set signal for setting a variable duty ratio by pulse-width modulation (PWM) is generated, and is supplied to each winding of a motor, so that a current value which corresponds to a vector component matching an arbitrary rotational position of the motor to some extent is supplied to each winding. More specifically, since it is theoretically ideal to supply a current value, which changes in a sine waveform pattern, to each winding, a current value with a staircase waveform which is approximates to the sine waveform as much as possible is supplied to each winding of the motor. Two-phase excitation driving in the open PWM control system will be explained below.

FIG. 21 shows a driving circuit of a stepping motor. The driving circuit shown in FIG. 21 comprises a micro-controller 201 for performing motor control, a pulse-width modulation unit (to be referred to as a PWM unit hereinafter) 202 which is incorporated in the micro-controller 201 and outputs pulse signals E and F whose frequencies and duty ratios can be set, an output port 203 which is incorporated in the micro-controller 201 and generates coded stepping motor control signals A, B, C, and D, a unipolar-coupled two-phase stepping motor 204, transistors 205 for exciting the stepping motor 204 in accordance with the control signals A, B, C, and D, current control transistors 206 for controlling currents flowing through the stepping motor 204 in accordance with the pulse signals E and F, fly-wheel diodes 207 for forming current paths when the current control transistors 206 are turned off, diodes 208 for preventing reverse currents due to induced voltages at the windings of the stepping motor 204, a programmable timer unit 209 incorporated in the micro-controller 201, and a ROM 210 which stores data such as the driving speed, the PWM duty ratio, and the like of the motor 204. The micro-controller 201 reads out such data from the ROM 210.

FIG. 22 shows the waveforms of the control signals for controlling the stepping motor 204. The micro-controller 201 generates the control signals A, B, C, and D for performing two-phase excitation driving of the stepping motor 204 via the output port 203. When these control signals are at the H level, the transistors 205 connected to these control signals are turned on, and the corresponding windings of the stepping motor 204 are excited. The change timing of each control signal, i.e., step time, is determined by the micro-controller 201 using the timer unit 209. By adjusting the step time, respective modes such as acceleration, deceleration, constant-speed operation, and the like are controlled.

The micro-controller 201 controls the PWM unit 202 to output the pulse waveforms E and F. These pulse waveforms are set to be pulse-output at a predetermined frequency (e.g., a frequency of 20 kHz or higher, which is higher than the audible range of a man) to have a predetermined duty at predetermined timings. The change timing of the duty ratio is also determined by the micro-controller 201 using the timer unit 209. When the pulse outputs are at the H level, the current control transistors 206 are turned on, and supply electric power to the motor 204. When the current control transistors 206 are turned off, electric power accumulated on in the motor 204 is discharged via the corresponding fly-wheel diodes 208. Upon repetition of these operations, the current to be supplied to the winding of the motor 204 can be controlled in accordance with the duty ratio of the pulse waveforms E and F.

FIG. 23 shows an example of PWM duty data stored in the ROM 210. Numerals 1 to 8 in the upper row are ROM addresses which are assigned for convenience, and numerical values in the lower row represent PWM duty ratios stored at respective addresses.

FIG. 24 shows the motor driving waveforms based on the PWM duty ratio data shown in FIG. 23. Note that signal waveforms E and F are not actual pulse waveforms, but express the duty ratios of pulses by their signal levels. Referring to FIG. 23, the micro-controller 201 changes the driving signals A and C, and sets the duty ratio of the PWM pulse signal E to be 40% in accordance with the numerical value, "40", stored at address 1 in the ROM 210. Thereafter, when the time ¼ the step period has elapsed, the micro-controller 201 sets the duty ratio of the PWM pulse signal E to be 60% in accordance with the numerical value, "60", stored at address 2 in the ROM 210. Similarly, the micro-controller 201 sequentially reads out PWM data from the ROM 210, and sets the duty ratios. As for the PWM pulse signal F, values which are phase-shifted by 90° from the signal E are set. Therefore, for example, when the signal E is set to have a value corresponding to data read out from address 1, the signal F is set to have a value corresponding to data read out from address 5. With the above-mentioned system, the current flowing through the motor can be controlled at a period ¼ the step interval, and the same effect as that of a conventional driving system, known as a double 1-2 phase driving system can be obtained. More specifically, when the current waveform of the motor approximates a sine waveform, the motor can be operated with high efficiency and low vibration. Since the current flowing through the motor is influenced by the inductance of the motor winding and the counter-electromotive force, the PWM duty ratio is normally not proportional to the motor current. However, when duty ratio data in which these influences are corrected in advance are stored in the ROM 210, the current waveform can be controlled while approximating a sine waveform.

As described above, since the open PWM control system drives the motor based on a current value approximate to a sine wave, the problems (2) and (3) of the constant voltage driving system and the constant current driving system can be solved to some extent. However, these problems are not sufficiently solved, and the open PWM control system suffers the following problems.

(1) Since the open PWM control is an open system having no feedback loop, the pulse width of each PWM signal must be set by experimental trial and error so that the current flowing through the motor coil has a desired waveform.

(2) For example, a variation in value of a current flowing through each winding is large due to variations in the characteristics of transistors and diodes constituting the motor driving circuit. When the variation in current value is large, the variation in torque becomes large, and rotation nonuniformity occurs. As a result, constant-speed rotation cannot be attained. The current value varies due to a variation in source voltage, and the torque varies.

(3) In order to approximate the current waveform to an identical sine waveform as much as possible, a staircase waveform must be further smoothed. However, the number of times of switching of the level of the current value is eight per control signal, and a sufficiently smooth sine waveform cannot be obtained yet.

(4) A PWM memory table (a memory table of ON/OFF data) for the motor rotational speed is required, and a large volume of data must be stored in the memory (ROM).

On the other hand, a recording apparatus for performing recording on a recording sheet by scanning a carriage which mounts a recording head uses a stepping motor or a DC motor to scan the carriage.

In a recording apparatus, when a stepping motor is used in the above-mentioned open PWM control system, since high-precision, constant-speed rotation cannot be sufficiently obtained, printed (recorded) image nonuniformity may occur. In addition, since wasteful consumption power cannot be sufficiently eliminated, the service life of a battery cannot be prolonged in, e.g., a portable recording apparatus which receives electric power from a battery.

The DC motor is free from rotation nonuniformity at high speeds, and is suitable for constant-speed rotation. However, when a DC motor is used in a recording apparatus, a linear encoder for position detection, and a control circuit for processing a signal from the linear encoder and performing position control are required, resulting in a higher cost than an apparatus using a stepping motor.

SUMMARY OF THE INVENTION

It is an object of the present invention to provide a stepping motor control system, which can solve the above-mentioned problems, can eliminate wasteful consumption power, and can attain high-precision, constant-speed rotation.

It is another object of the present invention to provide a recording apparatus using a stepping motor control system, which is free from printing nonuniformity, and can attain power savings.

Other objects and features of the present invention will become apparent from the following detailed description of the embodiments.

BRIEF DESCRIPTION OF THE DRAWINGS

FIGS. 3A to 3C' are waveform charts for explaining the function of a low-pass filter;

FIGS. 5A to 5H are waveform charts for explaining the function of the overall stepping motor (unipolar motor) driving device in the case of two-phase excitation;

FIGS. 7A to 7D are waveform charts of control signals used in the stepping motor (bipolar motor) driving device in the case of two-phase excitation;

FIG. 8 is a circuit diagram of a low-pass filter using an operational amplifier;

FIG. 22 is a waveform chart showing control signals for controlling a conventional stepping motor;

FIG. 23 is a table showing an example of PWM duty data stored in a ROM as a memory of a micro-controller for the conventional stepping motor; and FIG. 24 is a waveform chart showing the motor driving waveforms based on the PWM duty ratio data.

BRIEF DESCRIPTION OF THE PREFERRED EMBODIMENTS

The preferred embodiments of the present invention will be described hereinafter with reference to the accompanying drawings.

Figure 1:
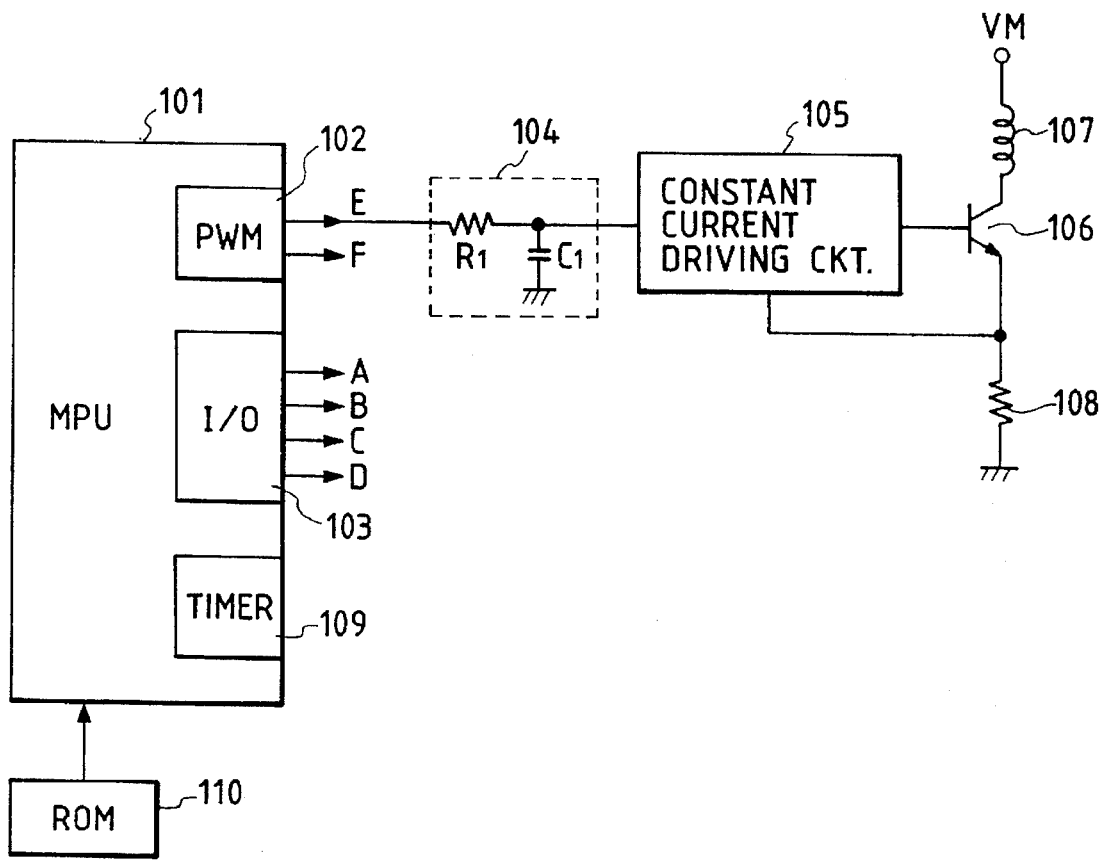
FIG. 1 is a block diagram for explaining the principle of a stepping motor driving device according to the present invention.
Figure 2A:
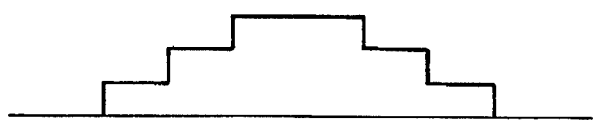
FIGS. 2A and 2B are waveform charts for explaining the function of an arbitrary current value setting type constant current driving circuit (to be simply referred to as a constant current driving circuit hereinafter) used in the stepping motor driving device.
Figure 2B:
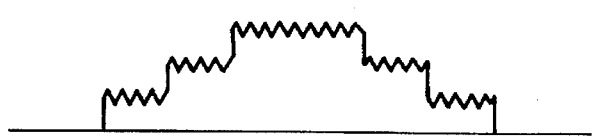

FIG. 1 is a block diagram for explaining the principle of a stepping motor driving device according to the present invention, FIGS. 2A and 2B are waveform charts for explaining the function of an arbitrary current value setting type constant current driving circuit (to be simply referred to as a constant current driving circuit hereinafter) used in the stepping motor driving device, and FIGS. 3A to 3C' are waveform charts for explaining the function of a low-pass filter.

The following description will be given with reference to FIG. 1. FIG. 1 is a diagram for explaining the principle of a stepping motor according to the present invention, and illustrates only one current control transistor and an associated motor winding portion as a motor winding excitation circuit for the sake of descriptive convenience. Referring to FIG. 1, a micro-controller 101 for controlling a stepping motor incorporates a PWM unit 102. The PWM unit 102 outputs pulse signals E and F whose frequencies and duty ratios can be set. An output port 103 is incorporated in the micro-controller 101, and outputs coded stepping motor control signals (to be simply referred to as control signals hereinafter) A, B, C, and D. The micro-controller 101 also incorporates a programmable timer unit 109. The timer unit 109 is used for setting the change timing of each control signal, i.e., the step time, and the like. A ROM 110 stores data such as the driving speed, PWM duty ratio, and the like of the motor.

The pulse signal E output from the PWM unit is input to a low-pass filter 104 constituted by a resistor R1 and a capacitor C1. Note that the function of the low-pass filter 104 will be described later. The output from the low-pass filter 104 is input to a constant current driving circuit 105, and the output from the circuit 105 is input to a current control driving transistor 106. A motor winding 107 is connected between the current control transistor 106 and a power supply, and a sensor resistor 108 is connected between the current control transistor 106 and ground.

The constant current driving circuit 105 serves to supply a current determined by a voltage input to its input terminal to the motor winding. As will be described in detail later, the circuit 105 compares a voltage (to be referred to as a reference voltage hereinafter) determined by the current value flowing through the sensor resistor 108 and a voltage input to the input terminal using a comparator (to be described in detail later with reference to FIG. 4). When the current value flowing through the motor winding becomes larger, the circuit 105 decreases the current value; when the current value flowing through the motor winding becomes smaller, the circuit 105 increases the current value, so as to supply a constant current determined by the input voltage value to the motor winding independently of a variation in source voltage of the current control transistor. Since the current value is determined by the input voltage value, as described above, the current value changes upon changing the input voltage value. Therefore, the circuit 105 is an arbitrary current value setting type constant current driving circuit.

A supplementary explanation as to the above-mentioned contents will be given with reference to FIGS. 2A and 2B. FIGS. 2A and 2B show the input waveform (voltage waveform) of the constant current driving circuit (FIG. 2A), and the waveform of the winding current value obtained based on the input waveform (FIG. 2B). For example, when a staircase voltage value is input as an input voltage, a current corresponding to the input voltage value, i.e., having a current value determined by the input voltage value, is supplied to the motor winding. The supplied current includes small ripple components (shown in an enlarged scale in FIG. 2B), since the constant current driving circuit 105 compares the input voltage and the reference voltage and ON/OFF-controls the input voltage, as will be described later.

The function of the low-pass filter 104 will be described below with reference to FIGS. 3A to 3C'. For example, if a PWM signal (FIG. 3A) is designed to generate a staircase voltage signal (a voltage signal whose duty ratio changes stepwise), the low-pass filter 104 which receives the PWM signal smooths the steps of the staircase voltage (indicated by a dotted curve) upon operation of its capacitor, as shown in FIG. 3B, and outputs a voltage defined by a smooth curve. For example, when such a voltage is input to the above-mentioned constant current driving circuit to control the current of the motor winding, a winding current value determined in correspondence with the voltage signal is obtained, as shown in FIG. 3C. In the present invention, in order to smooth a staircase signal as much as possible, the number of times of switching of steps is preferably increased as much as possible, as shown in FIG. 3B' (in FIG. 3B', the number of times of switching of steps is small for the sake of convenience, but in practice, switching of steps is performed a large number of times), i.e., a micro-step voltage signal is preferably generated, so as to further smooth the winding current value, as shown in FIG. 3C'. When a micro-step voltage signal is generated, the low-pass filter may be omitted. In this case, as will be described in another embodiment to be described later, a D/A converter for generating a micro-step voltage signal may be used in place of the PWM unit for generating PWM signals.

Figure 4:
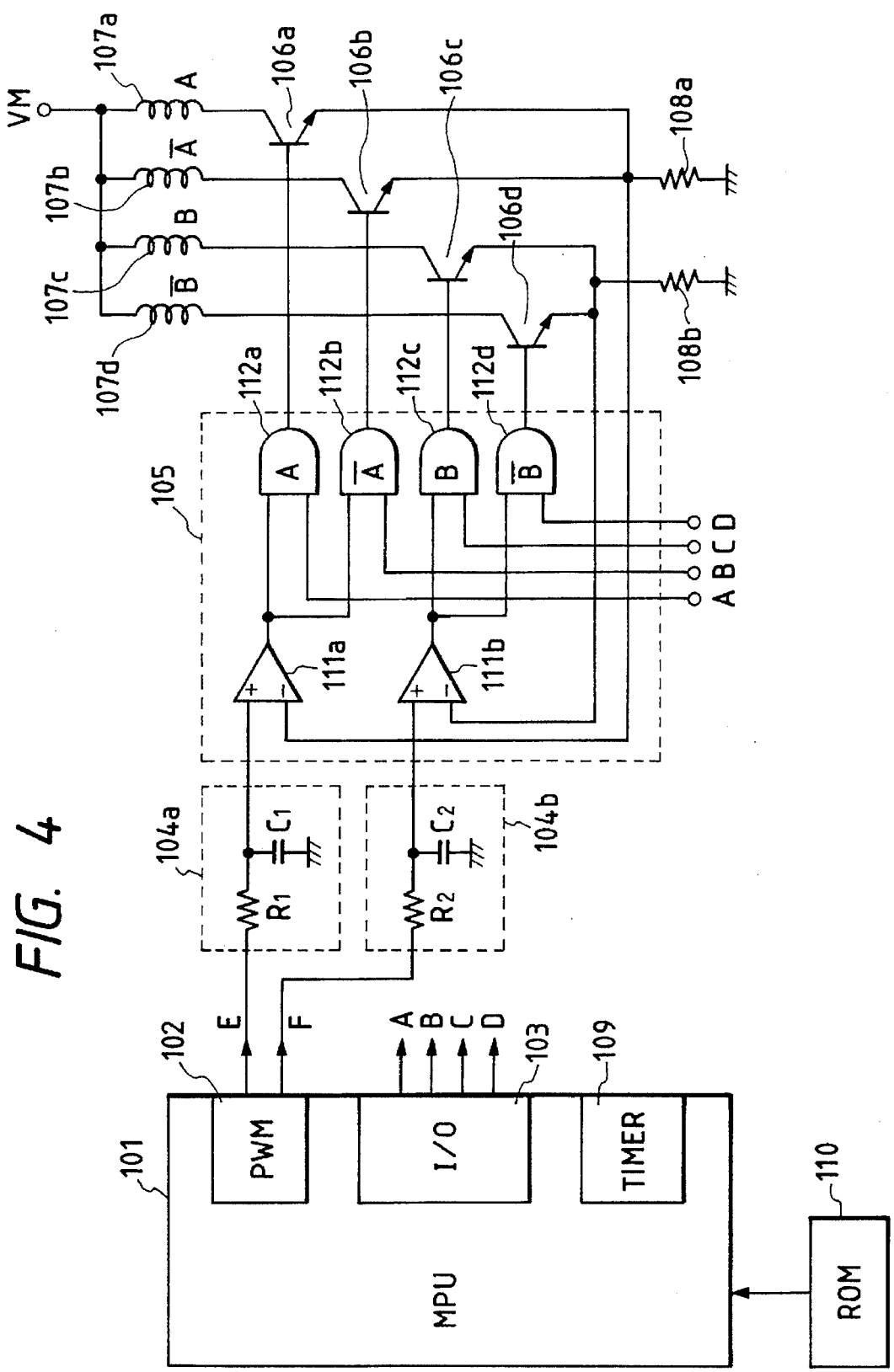
FIG. 4 is a circuit diagram of a stepping motor (unipolar motor) driving device.
Figure 6:
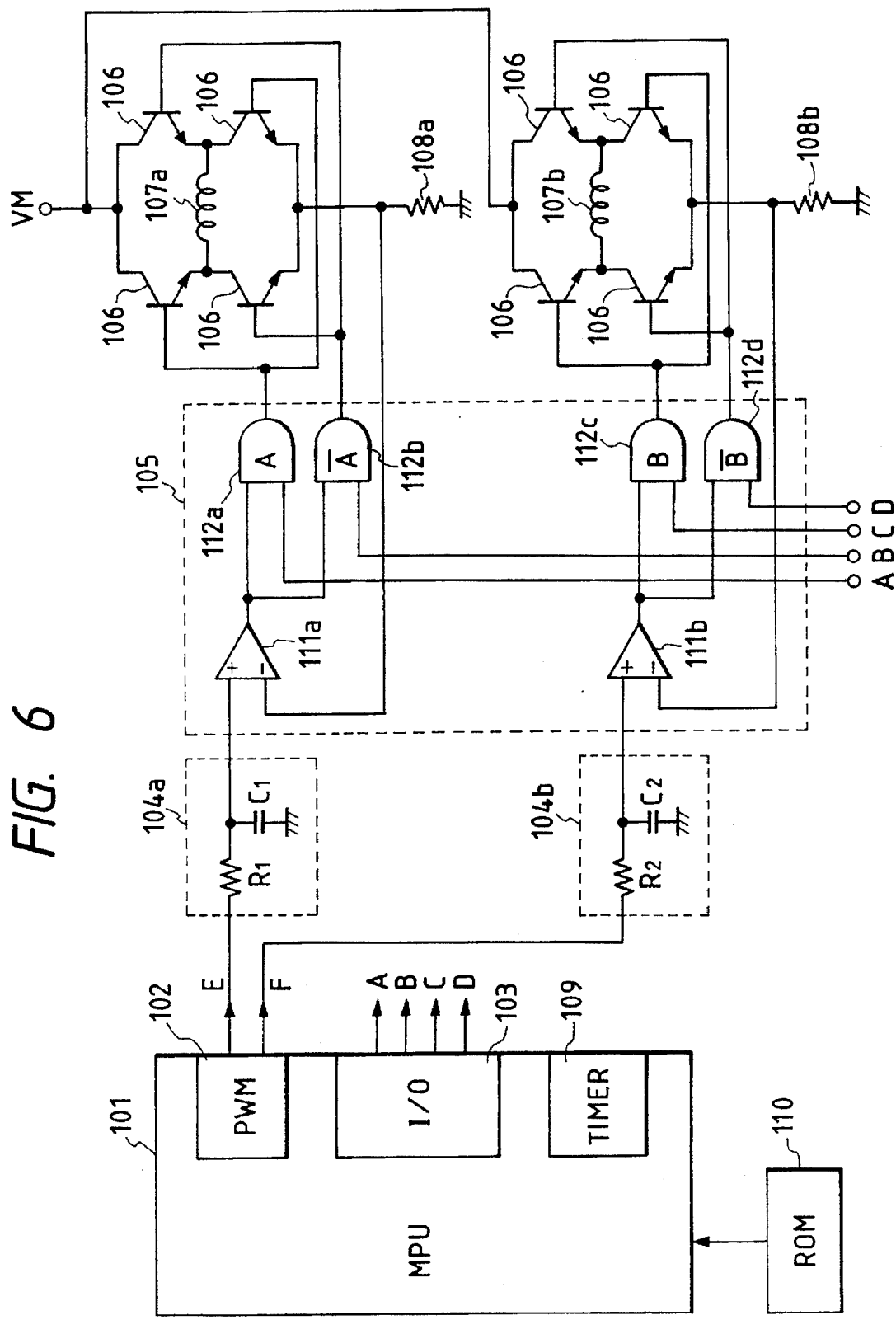
FIG. 6 is a circuit diagram showing a stepping motor (bipolar motor) driving device as another embodiment.

The entire stepping motor driving device of the present invention will be described below with reference to FIGS. 4 to 7D. FIG. 4 is a circuit diagram of a stepping motor (unipolar motor) driving device (note that reverse flow prevention diodes and fly-wheel diodes are not shown in FIG. 4 since they are the same as those in the prior art), and FIGS. 5A to 5H are waveform charts for explaining the function of the entire stepping motor (unipolar motor) driving device in the case of two-phase excitation. FIG. 6 is a circuit diagram of a stepping motor (bipolar motor) driving device as another embodiment (note that reverse flow prevention diodes and fly-wheel diodes are not shown in FIG. 6 since they are the same as those in the prior art), and FIGS. 7A to 7D are waveform charts showing control signals used in the stepping motor (bipolar motor) driving device in the case of two-phase excitation.

Referring to FIG. 4, the pulse signals E and F output from the PWM unit 102 are respectively input to low-pass filters 104a and 104b, and the outputs from the low-pass filters 104a and 104b are respectively input to one of the input terminals (the non-inverting terminals in FIG. 4) of comparators 111a and 111b of the constant current driving circuit 105. The other of the input terminals (the inverting terminals in FIG. 4) of the comparators 111a and 111b receive voltage signals (reference voltages) which are detected by sensor resistors 108a and 108b and are determined by currents flowing through the sensor resistors. Each of these comparators 111a and 111b compares the voltages input to the non-inverting and inverting terminals. When the input voltage to the non-inverting terminal is higher than that to the inverting terminal, each comparator generates an H (high)

output; when the input voltage to the non-inverting terminal is lower than that to the inverting terminal, each comparator generates an L (low) output. The output from the comparator 111a is input to one input terminals of A- and $\overline{A}$-phase AND gates 112a and 112b, and the other input terminals of the AND gates 112a and 112b receive control signals A and C. Therefore, when the control signals A and C input to the AND gates 112a and 112b are at an H level, the AND gates 112a and 112b supply the output (H or L) from the comparator 111a to current control transistors 106a and 106b to supply a current to the motor winding (motor coil).

Note that the output from the comparator 111b is input to one input terminals of B- and $\overline{B}$-phase AND gates 112c and 112d, and is similarly gated in accordance with control signals B and D input to the other input terminals of the AND gates, as described above.

The operation of the constant current driving circuit 105 will be described below. Assume that the control signal A is at an H level, and the pulse signal E as a PWM signal has a 50% duty. The output voltage from the low-pass filter 104a is 2.5 V (source voltage of 5 V). A voltage of 2.5 V is input to the non-inverting input terminal of the comparator 111a of the constant current driving circuit 105. At this time, if no current is supplied to the motor winding due to an initial state, and a voltage detected by the sensor resistor 108a (e.g., 1Ω) is equal to or lower than 2.5 V, since the voltage value applied to the non-inverting input terminal of the comparator 111a is higher than that applied to the inverting input terminal, the output from the comparator 111a goes to an H level. For this reason, since the two inputs of the AND gate 112a are at an H level, the output from the AND gate 112a changes to an H level. As a result, an H voltage is input to the base of the current control transistor 106a, and the transistor 106a is turned on. A current is supplied to the motor winding until the current value reaches 2.5 A. When the current value exceeds 2.5 A, the voltage detected by the sensor resistor 108a becomes equal to or higher than 2.5 V. As a result, the voltage at the inverting input terminal of the comparator 111a becomes higher than that at the non-inverting input terminal, and the output from the comparator 111a changes to an L level. Since this L output is input to one input terminal of the AND gate 112a, the output from the AND gate 112a changes to an L level to turn off the current control transistor 106a. For this reason, the current decreases, and the voltage detected by the sensor resistor 108a decreases to a value equal to or lower than 2.5 V. When the voltage value becomes equal to or lower than 2.5 V, the output from comparator 111a changes to an H level again, and the above-mentioned cycle is repeated. In this manner, the current value (e.g., 2.5 A) determined by the voltage (e.g., 2.5 V) input to the constant current driving circuit is maintained independently of the presence/absence of a variation in source voltage. For example, when the duty ratio is set to be 80%, a current value of 4 A corresponding to an input voltage of 4 V is maintained to be supplied to the motor winding.

The above description has been provided as to the A phase, and the same applies to the $\overline{A}$-, B-, and $\overline{B}$-phases.

The function of the entire stepping motor (unipolar motor) driving device in the case of two-phase excitation will be described below with reference to FIGS. 5A to 5H. Although two-phase excitation will be exemplified below, the present invention is not limited to two-phase excitation, but may be applied to other excitation systems such as a one-phase excitation, a 1-2 phase excitation, and the like.

In the case of two-phase excitation, waveforms A (A phase), B (B phase), C ($\overline{A}$ phase), and D ($\overline{B}$ phase) of control signals are rectangular waves having a 90° phase difference, as shown in FIGS. 5A to 5D. For this reason, in FIG. 4, in the ON state of the waveform A of the A phase, a predetermined current is supplied to an A-phase winding 107a via the constant current driving circuit 105 on the basis of the voltage from the low-pass filter 104a. After the 90° phase passes, in the ON state of the waveform B of the B phase, a predetermined current is supplied to a B-phase winding 107c via the constant current driving circuit 105 on the basis of the voltage from the low-pass filter 104b. Then, in the ON state of the waveform C of the $\overline{A}$ phase, a predetermined current is supplied to an $\overline{A}$-phase winding 107b via the constant current driving circuit 105 on the basis of the voltage from the low-pass filter 104a. Thereafter, after the 90° phase passes, in the ON state of the waveform D of the B phase, a predetermined current is supplied to a $\overline{B}$-phase winding 107d via the constant current driving circuit 105 on the basis of the voltage from the low-pass filter 104b. In this manner, a torque required for rotating the motor is supplied.

FIGS. 5E and 5F show the pulse signals E and F as PWM signals to be input to the low-pass filters 104a and 104b (for the sake of convenience, FIGS. 5E and 5F illustrate one ON state of each of the control signals A and B, and other states are not shown since they are repetitive states of the illustrated states). Each of the signals E and F is set to have a sine waveform since theoretically the voltages obtained via the low-pass filters 104a and 104b optimally have sine waveforms. However, square curve waveforms may often be suitable depending on the characteristics of the motor and other factors. Either the sine or square situations, or may be slightly modified (e.g., the ramp-up side is set to be less steeper than the ramp-down side).

FIGS. 5G and 5H show the voltage outputs from the low-pass filters 104a and 104b in the case of square curve waveforms. When such a voltage waveform is used for driving the motor via the constant current driving circuit 105, as described above with reference to FIG. 4, a current with a square curve waveform corresponding to this voltage waveform is supplied to the motor winding. As a result, constant-speed rotation with higher precision than that achieved by a staircase current in the conventional PWM control is realized, and wasteful consumption power can be eliminated.

FIG. 6 is a circuit diagram of a stepping motor (bipolar motor) driving device. A micro-controller 101, a PWM unit 102, an output port 103, a timer 109, a ROM 110, low-pass filters 104a and 104b, and a constant current driving circuit 105 are the same as those in the embodiment shown in FIG. 4. Transistors 106 are used for selecting a phase to be excited and the current direction.

As in the above embodiment, when two-phase excitation is performed, control signals A, B, C, and D shown in FIGS. 7A to 7D are used. Currents supplied to the transistors 106 are switched by these control signals, and two-phase control similar to that in the above embodiment can be attained. In this embodiment as well, pulse signals E and F and the low-pass filters 104a and 104b are controlled by the same waveforms (FIGS. 5F to 5H) as in the above embodiment.

Another embodiment of a low-pass filter will be explained below with reference to FIG. 8. FIG. 8 is a circuit diagram of a low-pass filter using an operational amplifier. A resistor 305, a capacitor 307, a resistor 306, and a capacitor 308 are used as external elements of an operational amplifier 304 to constitute the low-pass filter. Since the arrangement of this embodiment can provide steeper low-pass filter characteristics than those in the above embodiment, a smoother output can be generated. When the input impedance of the constant current driving circuit 105 which receives the output from the low-pass filter is low, the output from the low-pass filter is influenced by the low impedance in the above embodiment. However, according to this embodiment, since the output signal from the low-pass filter has a high impedance, the output from the low-pass filter is not influenced by the impedance of the constant current driving circuit. In this manner, the low-pass filter of this embodiment is very effective for the constant current driving circuit with a low input impedance since it has an impedance conversion function in addition to the low-pass filter characteristics.

Figure 9:
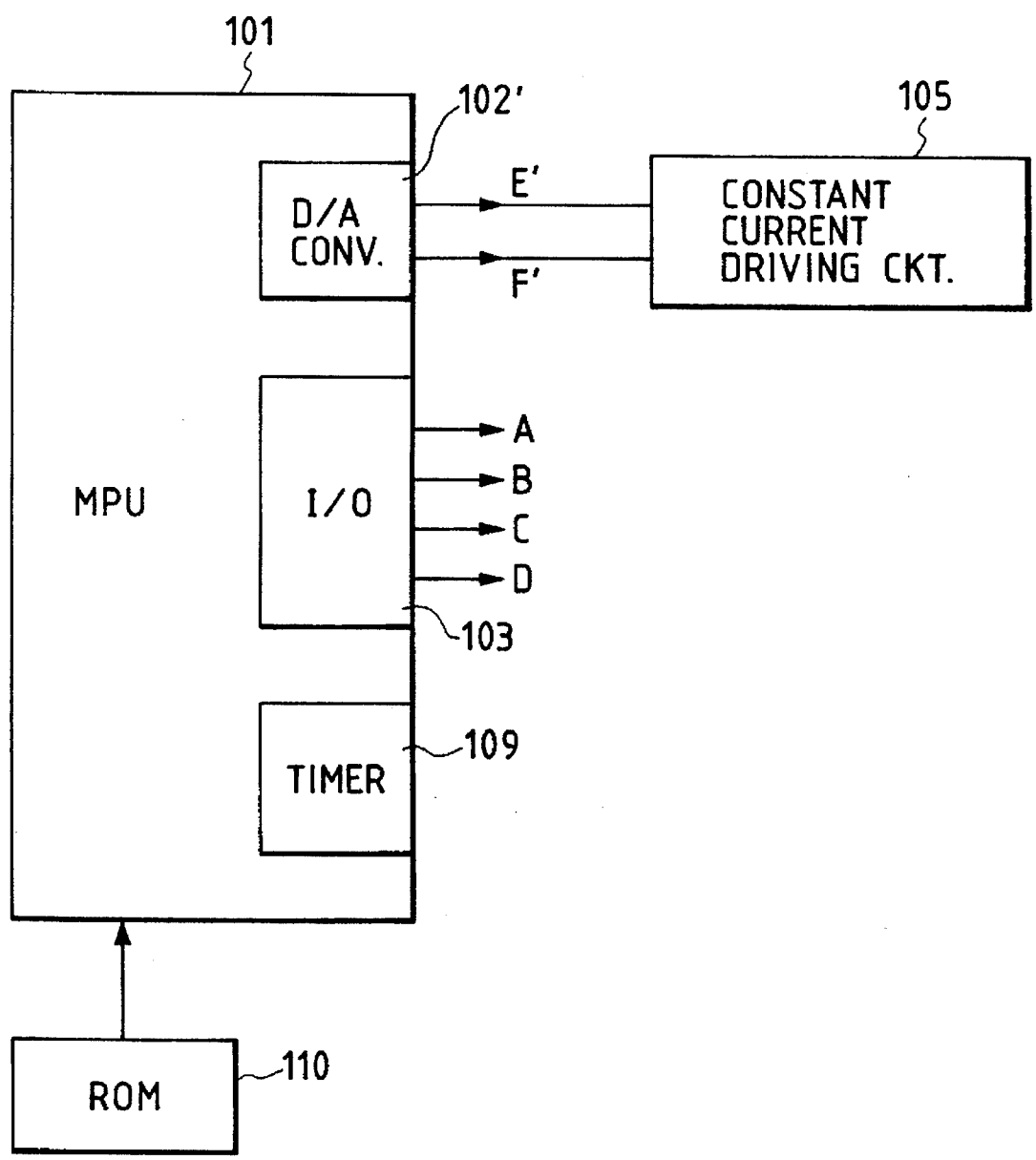
FIG. 9 is a block diagram showing a principal part of a stepping motor driving device.

Another embodiment of a stepping motor driving device will be described below with reference to FIG. 9. FIG. 9 is a block diagram showing principal part of the stepping motor driving device (the same portions as in the above embodiment are not shown). In this embodiment, a micro-controller 101 incorporates a D/A converter 102' for generating staircase voltage waveforms as outputs E' and F'. A voltage waveform is obtained by approximating a sine or square curve waveform. A voltage signal preferably adopts a micro-step voltage signal as fine as possible. These outputs are input to a constant current driving circuit as in the above embodiment. This embodiment is inferior to the above embodiment using the low-pass filters in that the motor is driven by a current with a smooth waveform, but is superior to the conventional open PWM control system in that a current can be set independently of a variation in source voltage, and a staircase voltage waveform to be output from the D/A converter can be easily set and (need not be experimentally determined).

A recording apparatus which is suitable for adopting the above-mentioned stepping motor driving device of the present invention will be described below. Since the stepping motor driving device of the present invention is particularly suitably applied to a chargeable (portable) ink-jet recording apparatus, the following description will be provided in association with a chargeable ink-jet recording apparatus. However, the recording apparatus of the present invention is not limited to this.

FIGS. 10 to 14 are explanatory views for explaining the arrangements of an ink-jet unit IJU, an ink-jet head IJH, an ink tank IT, an ink-jet cartridge IJC, an ink-jet recording apparatus main body IJRA, and a carriage HC in the recording apparatus of the present invention. The arrangements of the respective units will be explained below with reference to these drawings.

Figure 11:
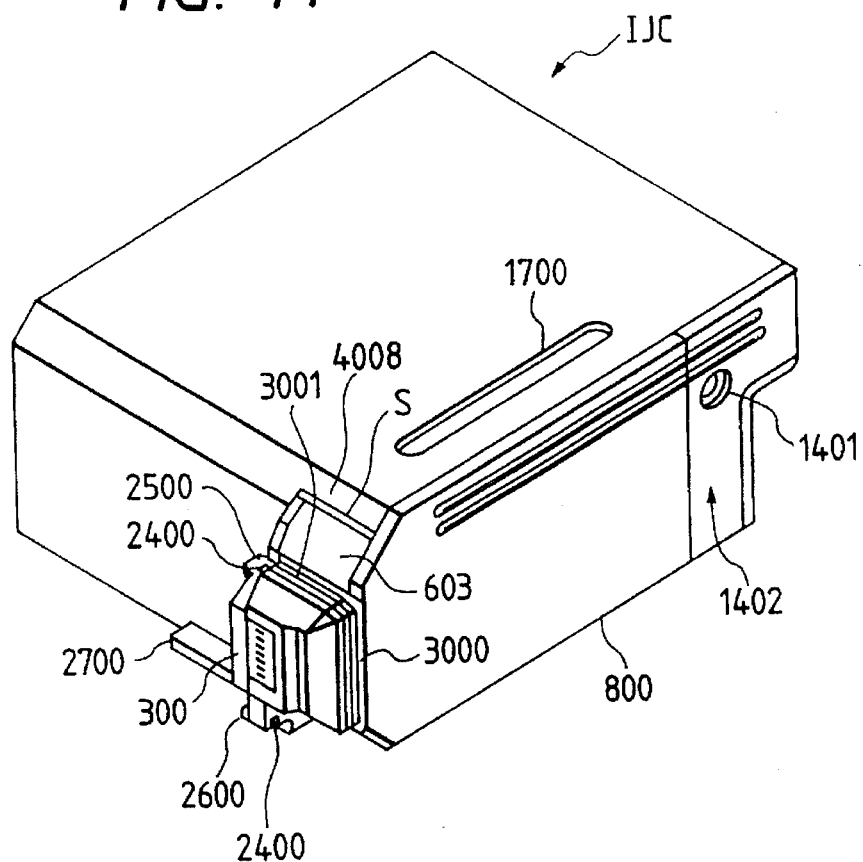
FIG. 11 is a perspective view showing the assembled state of the cartridge shown in FIG. 10.

As can be seen from the perspective view in FIG. 11, the ink-jet cartridge IJC has a large storage ratio of an ink, and has a shape in which the distal end portion of the ink-jet unit IJU slightly projects from the front surface of the ink tank IT. The ink-jet cartridge IJC is of disposable type, i.e., is fixed and supported by alignment means and electrical contacts (to be described later) of the carriage HC (FIG. 13) mounted on the ink-jet recording apparatus main body IJRA, and are detachable from the carriage HC.

(i) Arrangement of Ink-jet Unit IJU

The ink-jet unit IJU is a bubble-jet type unit which performs recording using electro-thermal conversion elements for generating heat energy to cause film boiling in an ink in correspondence with an electrical signal.

Figure 10:
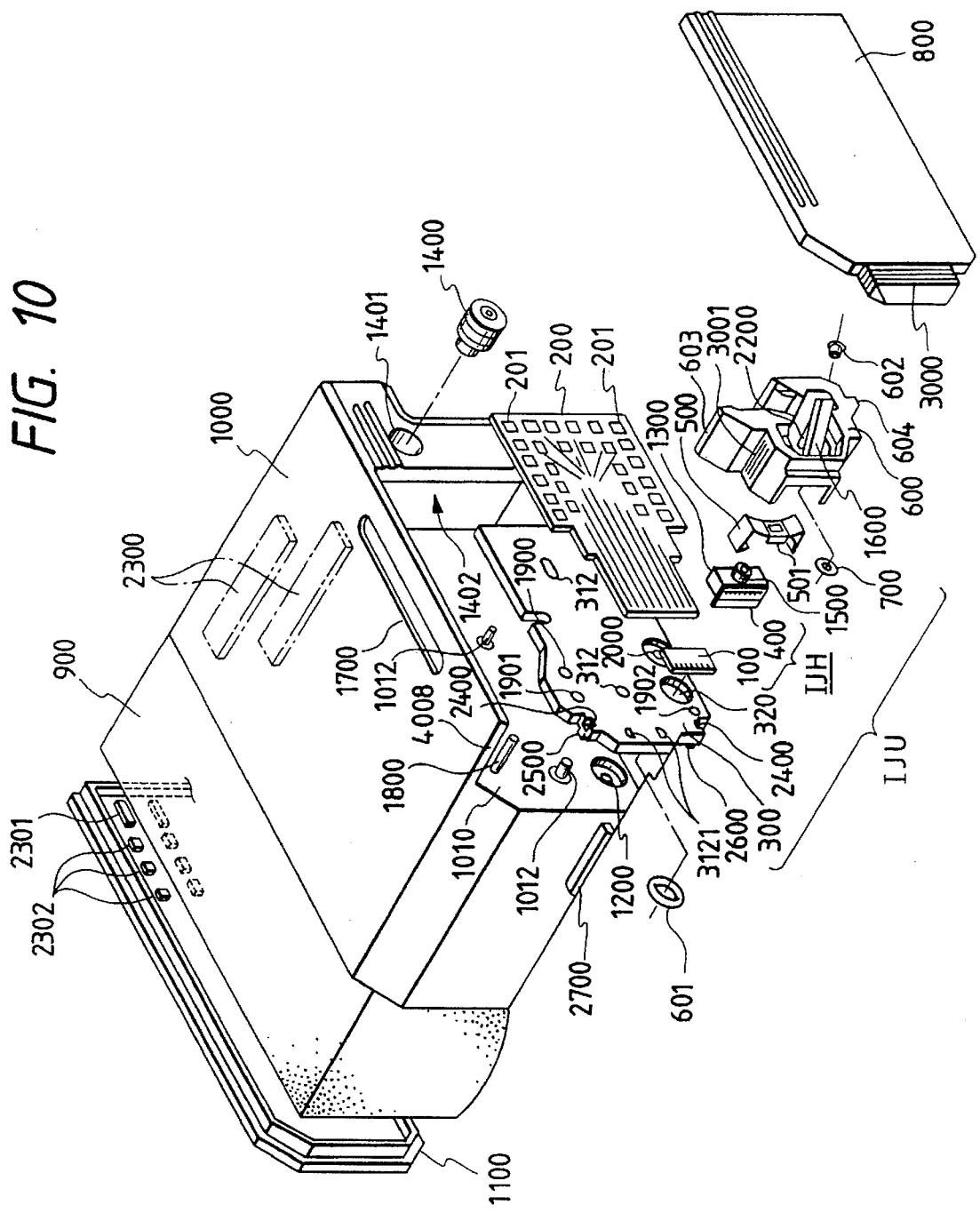
FIG. 10 is an exploded perspective view of a cartridge used in a recording apparatus according to the present invention.

Referring to FIG. 10, a heater board 100 is constituted by forming a plurality of electro-thermal conversion element arrays (ejection heater arrays) and an electric wiring layer of, e.g., aluminum for supplying electric power to the heaters on an Si substrate. A wiring board 200 for the heater board 100 has wiring lines corresponding to those of the heater board 100 (connected by, e.g., wire bonding) and pads 201 which are located at the end portions of the wiring lines and receive an electrical signal from the main body apparatus. A grooved top plate 1300 is provided with partition walls for separating a plurality of ink channels, a common ink chamber for storing an ink to be supplied to the respective ink channels, and the like. The top plate 1300 is constituted by integrally molding an ink reception port 1500 for receiving the ink supplied from the ink tank IT and supplying it to the above-mentioned common ink chamber, and an orifice plate 400 having a plurality of ejection orifices corresponding to the ink channels. As an integral molding material of these members, polysulfone is preferable, but other molding resin materials may be used.

A support member 300 consists of, e.g., a metal, and two-dimensionally supports the rear surface of the wiring board 200. The support member 300 serves as a bottom plate of the ink-jet unit. A pressing spring 500 has an M shape. The pressing spring 500 presses the common ink chamber by the central portion of the M shape at a low pressure, and locally presses a portion of an ink path, preferably, a region near the ejection orifices, by an apron portion 501 at a linear pressure. The heater board 100 and the top plate 1300 are fixed under pressure by the local biasing force of the pressing spring 500 and its apron portion 501, in such a manner that the leg portions of the pressing spring engage with the rear surface side of the support member 300 via holes 3121 of the support member 300 while sandwiching the heater board 100 and the top plate 1300 between the press spring and the support member. The support member 300 has alignment holes 312, 1900, and 2000 which respectively engage with two alignment projections 1012 and projections 1800 and 1801 for alignment and thermal-fusion holding, and also has alignment projections 2500 and 2600 for the carriage HC of the apparatus main body IJRA on its rear surface side. In addition, the support member 300 has a hole 320 through which an ink supply pipe 2200 (to be described later) for allowing ink supply from the ink tank extends. The wiring board 200 is adhered to the support member 300 by, e.g., an adhesive. Recess portions 2400 of the support member 300 are respectively formed in the vicinity of the alignment projections 2500 and 2600 (on the rear surface side). Also, the recess portions 2400 are present on the extending lines of a plurality of parallel grooves 3000 and 3001 formed on the three sides of a head distal end region of the assembled ink-jet cartridge IJC (FIG. 11). For this reason, foreign matter such as dust, ink, and the like, which move along the parallel grooves 3000 and 3001, are prevented from reaching the projections 2500 and 2600. As can be seen from FIG. 13, a lid member 800 formed with the parallel grooves 3000 forms the outer wall of the ink-jet cartridge IJC, and defines a space portion for storing the ink-jet unit IJU together with the ink tank. On the other hand, an ink supply member 600 formed with the parallel grooves 3001 has an ink guide pipe 1600 contiguous to the above-mentioned ink supply pipe 2200. A portion, on the supply pipe 2200 side, of the ink guide pipe 1600 is formed as a fixed cantilever, and a sealing pin 602 is inserted therein to assure a capillary phenomenon between the fixed side of the ink guide pipe and the ink supply pipe 2200. Note that a packing 601 is used for attaining a coupling seal between the ink tank IT and the supply pipe 2200, and a filter 700 is arranged at the tank side end portion of the supply pipe.

Since the ink supply member 600 is formed by molding, it is inexpensive, has high alignment precision, and can prevent a decrease in precision in the manufacture. In addition, since the guide pipe 1600 has a cantilever structure on the ink supply pipe side, the press-contact state of the guide pipe 1600 with respect to the above-mentioned ink reception port 1500 can be stabilized. For this reason, this structure is suitable for mass production. By filling a sealing adhesive from the ink supply member side in the press-contact state, a sufficient communication state can be reliably obtained. Note that the ink supply member 600 is easily fixed to the support member 300 in such a manner that pins (not shown), on the rear surface side, of the ink supply member 600 extend through holes 1901 and 1902 of the support member 300, and the projecting portions on the rear surface side of the support member 300 are thermally fused. Since the small thermally fused projecting regions on the rear surface portion are stored in a recess (not shown) of the side wall, on the ink-jet unit IJU mounting surface side, of the ink tank IT, the alignment surface of the unit IJU can be accurately obtained.

(ii) Arrangement of Ink Tank IT

The ink tank is constituted by a cartridge main body 1000, an ink absorber 900, and a lid member 1100 for sealing the ink absorber 900 after the ink absorber 900 is inserted from a side surface, opposite to the unit IJU mounting surface, of the cartridge main body 1000. The absorber 900 is used to hold an ink by impregnation, and is arranged in the cartridge main body 1000. A supply port 1200 is used for supplying an ink to the unit IJU constituted by the respective portions 100 to 600, and also serves as an injection port for attaining ink impregnation of the absorber 900 by injecting an ink from the supply port 1200 before the unit is arranged on a portion 1010 of the cartridge main body 1000.

Portions via which an ink can be supplied are an air communication port and this supply port. Since an intra-tank air region, formed to satisfactorily supply the ink from the ink absorber and defined by ribs 2300 in the main body 1000 and partial ribs 2302 and 2301 of a lid member 1100 extends across a corner portion farthest from the ink supply port 1200 to be contiguous from the side of an air communication port 1401, it is important to perform ink supply to the absorber from the supply port 1200 side to achieve relatively satisfactory and uniform ink supply. This method is very effective in practice. The ribs 2300 include four ribs parallel to the carriage moving direction on the rear surface of the main body 1000 of the ink tank, and prevent the absorber from contacting the rear surface. Partial ribs 2400 and 2500 are similarly arranged on the inner surface of the lid member 1100 present on the extending line corresponding to the ribs 2300. Unlike the ribs 2300, the partial ribs 2400 and 2500 are divided into small ribs to increase the air space as compared to the ribs 2300. Note that partial ribs 2302 and 2301 are distributed on a surface portion half the whole area of the lid member 1100. With these ribs, the ink in the corner region farthest from the ink supply port 1200 can be reliably guided toward the supply port 1200 side by a capillary force while being stabilized. The air communication port 1401 is formed in the lid member to communicate the interior of the cartridge with the air. A repellent member 1400 is arranged inside the air communication port 1401 to prevent ink leakage from the air communication port 1401.

The ink storage space of the above-mentioned ink tank IT has a rectangular parallelopiped shape, and has its one long side on the side surface. For this reason, the above-mentioned arrangement of the ribs is particularly effective. However, when the ink storage space has its one long side in the moving direction of the carriage or has a cubic shape, the ribs are arranged on the entire surface of the lid member 1100 to stabilize ink supply from the ink absorber 900. In order to store an ink in a limited space as much as possible, the ink storage space preferably has a rectangular parallelopiped shape. In this case, in order to efficiently use the stored ink for recording, it is important to arrange the ribs having the above-mentioned function on two surface regions adjacent to the corner region. Furthermore, the inner surface ribs of the ink tank IT in this embodiment are arranged to have an almost uniform distribution with respect to the direction of thickness of the ink absorber having the rectangular parallelopiped shape. This arrangement is important since it reduces the amount of ink which remains unused to almost zero while rendering the atmospheric pressure distribution uniform upon consumption of the ink stored in the absorber. Moreover, the technical principle as to arrangement of the ribs will be described in detail below. When an arc having one long side as a radius is drawn to have, as the center, the projecting position of the ink supply port 1200 of the ink tank onto a rectangular upper surface of the rectangular parallelopiped, it is important to arrange the ribs on a surface portion outside the arc, so that the atmospheric pressure state is attained early at an absorber portion located outside the arc. In this case, the position of the air communication port of the tank is not limited to that in this embodiment as long as it can guide the air to the rib arrangement region.

In addition, the rear surface of the ink-jet cartridge IJC with respect to the head is flattened to minimize the space required when the cartridge is assembled in the apparatus, and to maximize the ink storage amount. For this reason, the apparatus can be rendered compact, and the exchange frequency of the cartridge can be decreased as much as possible. By utilizing a rear portion of the space for integrating the ink-jet unit IJU, a projecting portion for the air communication port 1401 is formed there, and an atmospheric pressure supply space 1402 corresponding to the total thickness of the above-mentioned absorber 900 is formed in a cavity formed in the interior of the projecting portion. With this arrangement, a new, excellent cartridge can be provided. Note that the atmospheric pressure supply space 1402 is considerably larger than that in a conventional cartridge, and the air communication port 1401 is located on the upper portion of the space. For this reason, even when the ink is separated from the absorber due to any abnormality, the atmospheric pressure supply space 1402 can temporarily hold the separated ink, and the ink can be reliably recovered to the absorber. Therefore, an efficient cartridge can be provided.

Figure 12:
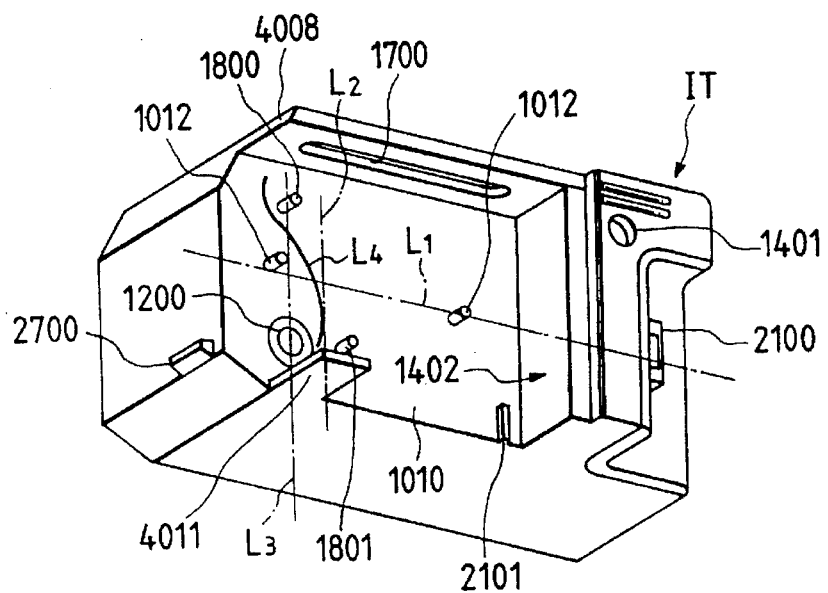
FIG. 12 is a perspective view of a mounting portion of an ink-jet unit IJU used in the recording apparatus of the present invention.

FIG. 12 shows the arrangement of the unit IJU mounting surface of the ink tank IT. If a straight line which passes substantially the center of the projecting port of the orifice plate 400 and is parallel to a mounting reference plane on the bottom surface of the tank IT or the surface of the carriage is represented by L1, the two alignment projections 1012 engaging with the holes 312 of the support member 300 are located along the straight line L1. The height of each projection 1012 is slightly smaller than the thickness of the support member 300 and is used for aligning the support member 300. In FIG. 12, a pawl 2100 which engages with a 90°-angled engaging surface 4002 of an alignment hook 4001 of the carriage is located on the straight line L1, so that an alignment action force for the carriage acts on a surface region parallel to the above-mentioned reference plane including the straight line L1. As will be described later with reference to FIG. 13, the relationship among these members provides an effective arrangement since the alignment precision of only the ink tank becomes equivalent to the alignment precision of the ejection orifices of the head.

On the other hand, the height of the projections 1800 and 1801 of the ink tank which respectively correspond to the fixing holes 1900 and 2000 of the support member 300 to the ink tank side surface is larger than that of the above-mentioned projections 1012, and these projections 1800 and 1801 are used for fixing the support member 300 to the side surface of the ink tank by thermally fusing the portions projecting through the support member 300. When a straight line perpendicular to the above-mentioned line L1 and passing the projection 1800 is represented by L3 and a straight line passing the projection 1801 is represented by L2, substantially the center of the supply port 1200 is located along the straight line L3. This arrangement is preferable since the coupling state between the supply port 1200 and the supply pipe 2200 can be stabilized, and the load on the coupling state of these members due to a drop or shock can be reduced. The straight lines L2 and L3 do not coincide with each other, and the projections 1800 and 1801 are present around the projection 1021 on the ejection orifice side of the head IJH, thus providing a reinforcing effect of alignment of the head IJH with respect to the tank. Note that a curve L4 represents the outer wall position when the ink supply member 600 is mounted. Since the projections 1800 and 1801 are located along the curve L4, a sufficient strength and position precision are attained to withstand the weight of the distal end side arrangement of the head IJH. Note that a distal end collar 2700 is inserted in a hole of a front plate 4000 of the carriage and is used in an abnormal state, e.g., when the ink tank is displaced in the extreme. A carriage stopper 2101 is arranged on a bar (not shown) of the carriage HC, and serves as a protection member for maintaining the mounting state even when the cartridge IJC enters below the bar at a position where the cartridge is turned and mounted, as will be described later, and an upward force for removing the cartridge from the alignment position inadvertently acts.

After the ink-jet cartridge IJC is assembled, ink is supplied from the interior of the cartridge into the supply member 600 via the supply port 1200, the hole 320 formed in the supply member 300, and an inlet port formed on the rear surface side of the supply member 600, and passes the interior of the supply member 600. Thereafter, the ink flows into the common ink chamber via an outlet port, the proper supply pipe, and the ink guide port 1500 of the top plate 1300. Packings of, e.g., silicone rubber, butyl rubber, or the like, are arranged on the above-mentioned connection portions for ink communication to provide a seal, thus assuring the existence of the ink supply path.

In this embodiment, the top plate 1300 is simultaneously formed in molds together with the orifice plate 400 using a resin with a high ink resistance such as polysulfone, polyether sulfone, polyphenylene oxide, polypropylene, or the like.

As described above, since the ink supply member 600, the integrated member of the top plate 1300 and the orifice plate 400, and the ink tank main body 1000 are formed by integral molding, not only high assembling precision is realized, but also quality upon mass production can be effectively improved. Since the number of members can be decreased as compared to the conventional cartridge, required characteristics can be reliably provided.

Upon assembly, as shown in FIGS. 10 to 12, an upper surface portion 603 of the ink supply member 600 forms a slit S with an end portion 4008 of a roof portion with a slit 1700 of the ink tank IT, as shown in FIG. 11, and its lower surface portion 604 forms a similar slit (not shown) to the slit S with a head-side end portion 4011 of a thin plate member to which the lower lid member 800 of the ink tank IT is adhered. These slits between the ink tank IT and the ink supply member 600 substantially promote the heat dissipation function of the slit 1700, and prevent an unnecessary pressure acting on the tank IT from directly acting on the supply member and the ink-jet unit IJU.

(iii) Mounting of Ink-jet Cartridge IJC on Carriage HC

Figure 13:
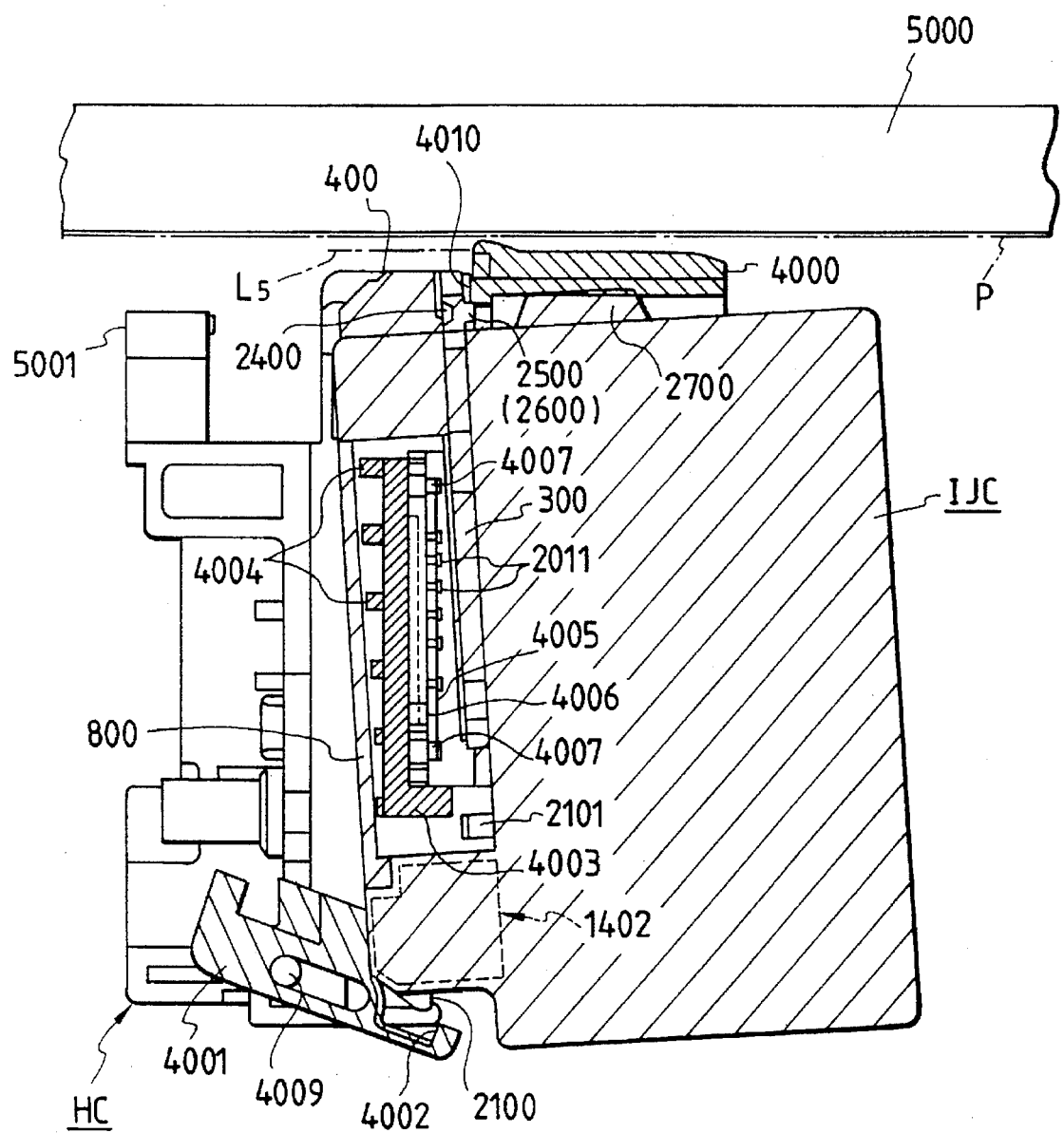
FIG. 13 is an explanatory view showing the mounting state of a cartridge IJC used in the recording apparatus of the present invention with respect to the apparatus.

In FIG. 13, a platen roller 5000 guides a recording medium P upward in the plane of the drawing of FIG. 13. The carriage HC moves along the platen roller 5000, and has, on its front side, i.e., on the platen side, the front plate 4000 (2 mm thick) located at the front surface side of the ink-jet Cartridge IJC, an electrical connection portion support plate 4003 which holds a flexible plate 4005 comprising pads 2011 corresponding to the pads 201 of the wiring board 200 of the cartridge IJC, and a rubber pad sheet 4007 for generating an elastic force for pressing the sheet 4005 against the pads 2011 from the rear surface side, and the alignment hook 4001 for fixing the ink jet cartridge IJC at the recording position. The front plate 4000 has two alignment projecting surfaces 4010 in correspondence with the alignment projections 2500 and 2600 of the support member 300 of the cartridge, and receives a force perpendicular to the projecting surfaces 4010 after the cartridge is mounted. A plurality of reinforcement ribs (not shown) extending in the direction of the perpendicular force are arranged on the platen roller side of the front plate. These ribs form head protection projecting portions which project slightly (about 0.1 mm) from a front surface position L5 of the mounted cartridge IJC toward the platen roller side. The electrical connection portion support plate 4003 has a plurality of reinforcement ribs 4004 extending not in the direction of the above-mentioned ribs but in a direction perpendicular thereto, and the lateral projecting distances of these ribs decrease stepwise from the platen side toward the hook 4001 side. These ribs also serve to incline the position of the mounted cartridge, as shown in FIG. 13. In order to stabilize the electrical contact state, the support plate 4003 has two hook-side alignment surfaces 4006 for giving an action force to the cartridge in a direction opposite to the direction of the action of the two alignment projecting surfaces 4010 to the cartridge, in correspondence with the projecting surfaces 4010, so as to form a pad contact region between these two alignment surfaces, and to uniquely determine the deformation amounts of pads of the rubber pad sheet 4007 corresponding to the pads 2011. These positioning surfaces contact the surface of the wiring board 200 when the cartridge IJC is fixed at a recordable position. In this embodiment, since the pads 201 of the wiring board 200 are distributed to be symmetrical about the above-mentioned line L1, the deformation amounts of the pads of the rubber pad sheet 4007 are rendered uniform to stabilize the contact pressure of the pads 2011. In this embodiment, the pads 2011 are distributed in two upper and lower lines and in two vertical lines.

The hook 4001 has an elongated hole engaging with a fixing shaft 4009. The hook 4001 is pivoted counterclockwise from the illustrated position in FIG. 13 by utilizing the moving space of the elongated hole, and the ink-jet cartridge IJC is moved to the left along the platen roller 5000, thereby aligning the cartridge to the carriage HC. The hook 4001 may be moved by any means, but is preferably moved by means of, e.g., a lever. In any case, upon pivotal movement of the hook 4001, the cartridge IJC moves to a position where the alignment projections 2500 and 2600 can contact the alignment surfaces 4010 of the front plate while moving toward the platen roller side. Upon leftward movement of the hook 4001, the 90° hook surface 4002 is turned in a horizontal plate about the contact region between the alignment projection 2500 and the alignment surface 4010 while being in tight contact with the 90° surface of the pawl 2100 of the cartridge IJC, and finally, the pads 201 and 2011 begin to contact each other. When the hook 4001 is held at a predetermined position, i.e., the fixing position, the perfect contact state between the pads 201 and 2011, the perfect surface contact between the alignment projection 2500 and the alignment surface 4010, the two-surface contact between the 90° surface 4002 and the 90° surface of the pawl, and the surface contact between the wiring board 200 and the alignment surface 4006 are simultaneously formed, thus completing holding of the cartridge IJC with respect to the carriage.

(iv) Brief Description of Recording Apparatus Main Body

Figure 14:
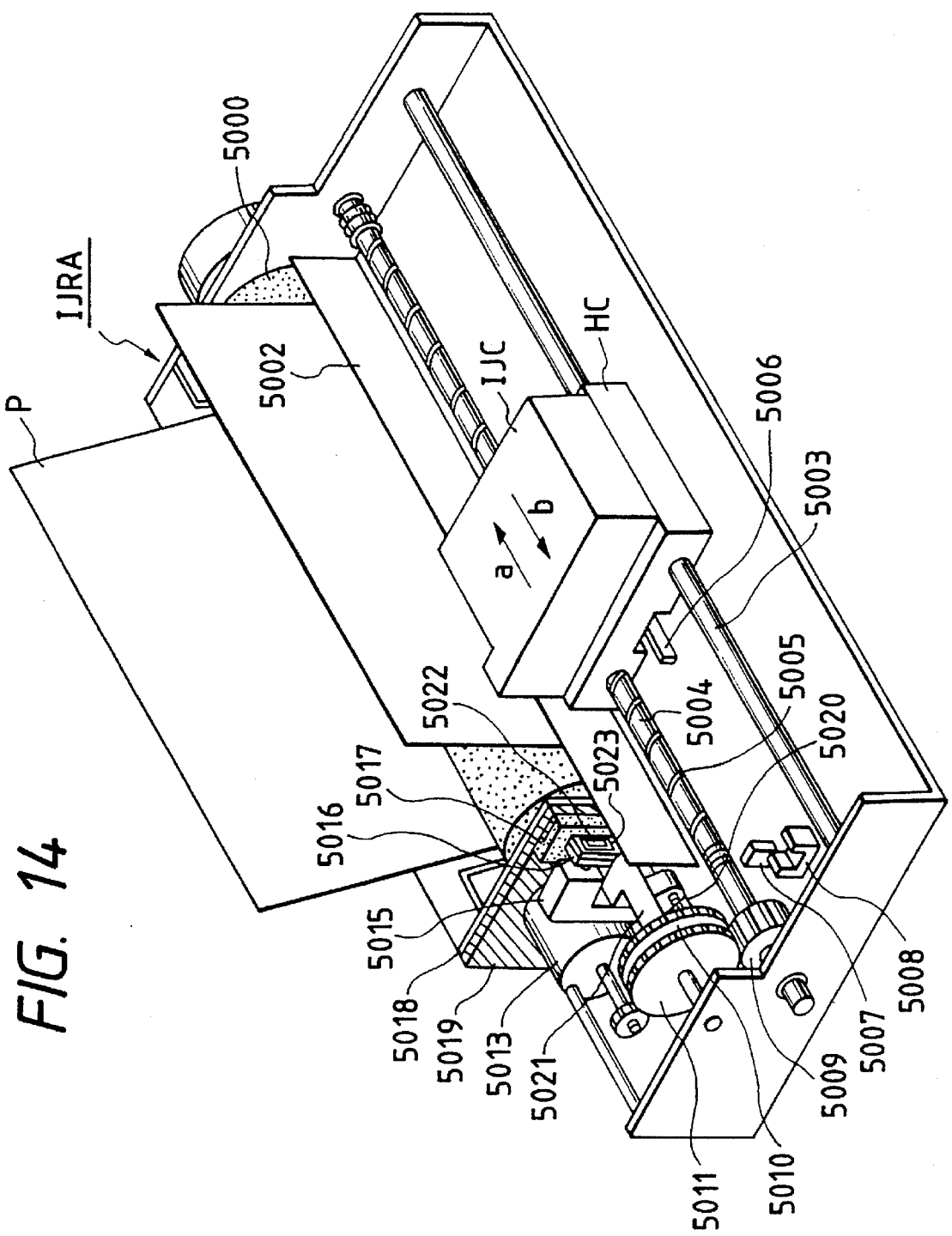
FIG. 14 is a perspective view showing the outer appearance of the recording apparatus of the present invention.

FIG. 14 is a perspective view showing the outer appearance of the ink-jet recording apparatus IJRA to which the stepping motor driving device of the present invention is applied. A carriage HC engages with a spiral groove 5004 of a lead screw 5005, which is rotated via driving force transmission gears 5011 and 5009 in synchronism with forward/reverse rotation of a driving motor 5013. The carriage HC has a pin (not shown), and is reciprocally moved in the directions of arrows a and b. A paper pressing plate 5002 presses a paper sheet against the platen roller 5000 across the moving direction of the carriage. Photocouplers 5007 and 5008 constitute home position detection means for confirming the presence of a lever 5006 of the carriage in a corresponding region, and performing, e.g., switching of the rotating direction of the motor 5013. A member 5016 supports a cap member 5022 for capping the front surface of the recording head, and a suction means 5015 for drawing the interior of the cap by suction performs suction recovery of the recording head via an intra-cap opening 5023. A cleaning blade 5017 is movable in the back-and-forth direction via a member 5019, and these members are supported on a main body support plate 5018. The blade is not limited to this, but a known cleaning blade can be applied to this embodiment. A lever 5021 is used for starting suction of the suction recovery. The lever 5021 moves upon movement of a cam 5020 which engages with the carriage, and the driving force from the driving motor is subjected to movement control by known transmission means such as clutch switching.

These capping, cleaning, and suction recovery members are arranged to perform required processing operations at their corresponding positions upon operation of the lead screw 5005 when the carriage reaches the home position side region.

Figure 15:
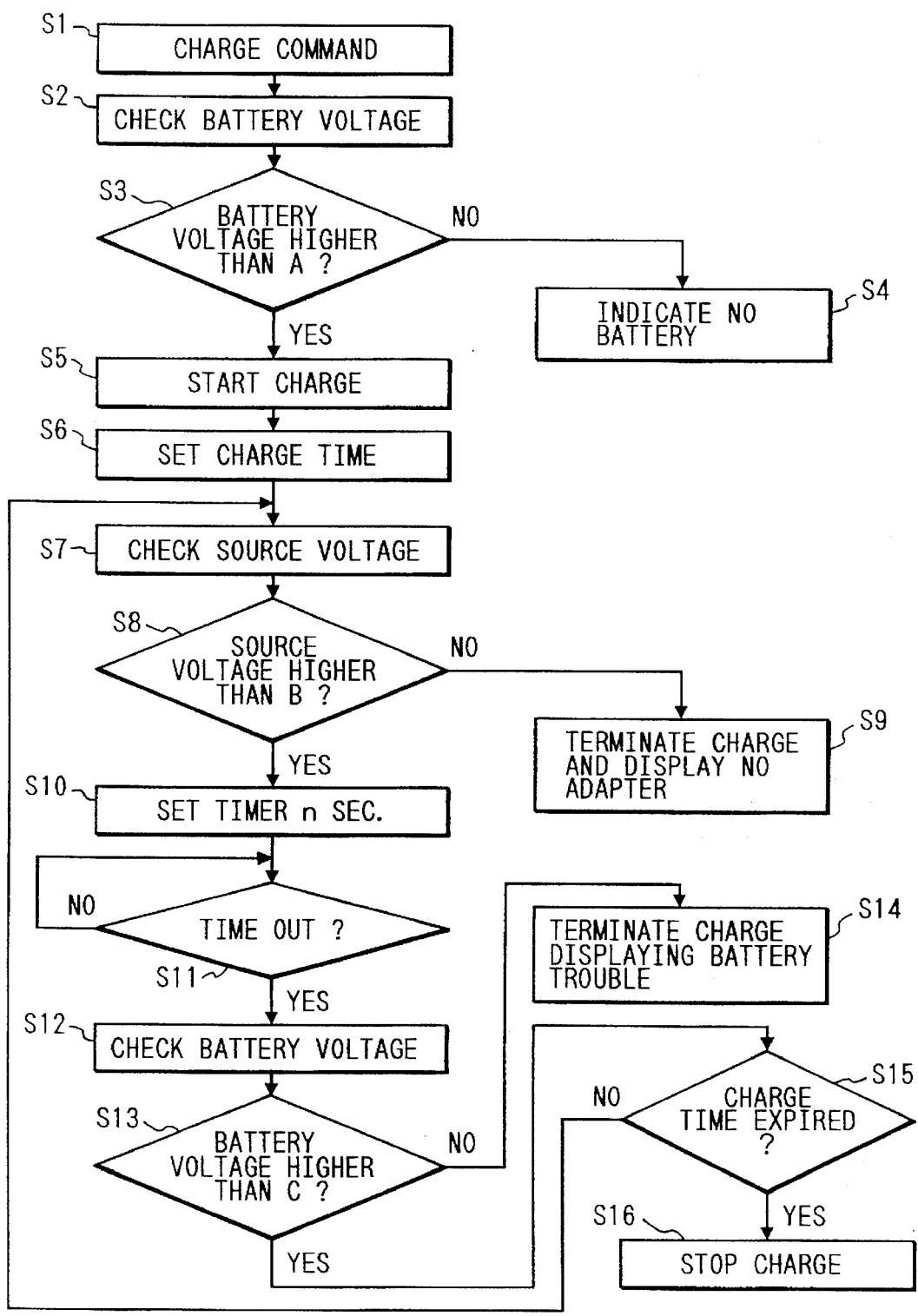
FIG. 15 is a flow chart showing the operation of a charge circuit used in the recording apparatus of the present invention.

A charge operation and a charge circuit used in the recording apparatus will be described below with reference to FIGS. 15 to 20B. FIG. 15 is a flow chart of the charge operation. The charge operation will be described below with reference to FIG. 15. In FIG. 15, the charge flow executed upon generation of a charge command (step S1) is performed in the order of the discrimination step of discriminating the mounting state of a secondary battery, the discrimination step of periodically discriminating the AC adapter connection state prior to the charge step or during charging, and the discrimination step of discriminating the abnormal state of the battery (in this embodiment, periodic confirmation is executed in consideration of a change during charging, but the present invention is not limited to this).

When a charge command is detected in step S1, the voltage of the battery to be mounted is checked (step S2). When the charge step is started in a state wherein the battery is not normally mounted, an idle charge time may be consumed, and a power Supply circuit may be damaged. This checking step is performed to prevent these. In this embodiment, the battery voltage is compared with a prescribed value A. The prescribed value A can be determined within a range wherein the battery cannot drive the apparatus but has a certain accumulation amount, since the accumulation amount of a re-chargeable battery does not normally become zero but remains at a level insufficient to drive the apparatus. In this embodiment, the prescribed value A is set to be 3 V. Therefore, when the discrimination result in step S3 indicates a voltaged of 3 V or higher, and the presence of a battery is determined, a charge operation is started in step S5.

On the other hand, if the discrimination result indicates a voltage of less than 3 V, since no battery is mounted, a message indicating "no battery" is displayed, and the charge step is not started until the battery is mounted. In this case, the battery may not often be normally mounted. For this reason, such a display can urge an operator to correct the battery position.

In the charge step, the charge time is set in step S6 after the charge operation is started. In this embodiment, since an NiCd secondary battery pack (five batteries of 1.2 V are series-connected: rating of 6.0 V) is used, 10 hours are set. Subsequently, in step S7, the source voltage is checked. In this step, any connection error of the adapter is detected to prevent any wasteful charge time, and to prevent a charge error due to discharge of the accumulation amount of the battery or the battery function from reaching a completely defective state although the battery can be still used. In this embodiment, if the AC adapter supplies a DC voltage of 9.5 V (1.5 A), the output voltage of the above-mentioned is about 7.8 V at maximum upon completion of the charge operation. For this reason, a prescribed value B as a discrimination criterion in step S8 is set to be 8 V, thereby periodically and accurately discriminating the adapter connection state during the charge period. As a result, if the source voltage is equal to or higher than the prescribed value B, the flow advances to step S10. However, if the source voltage is less than the prescribed value B, since the adapter is not connected, the charge operation is immediately terminated, and a message indicating "no adapter" is displayed. This step can also assure a sufficient countermeasure against a failure during the charge operation. In the source voltage checking step S7, easy discrimination may be attained when the charge operation is temporarily interrupted. However, it is preferable not to interrupt the charge operation in terms of stability of the charge operation.

In steps S10 to S13, the service life of the battery is discriminated on the basis of the charge curve (FIG. 16) in the charge voltage rise process.

Figure 16:
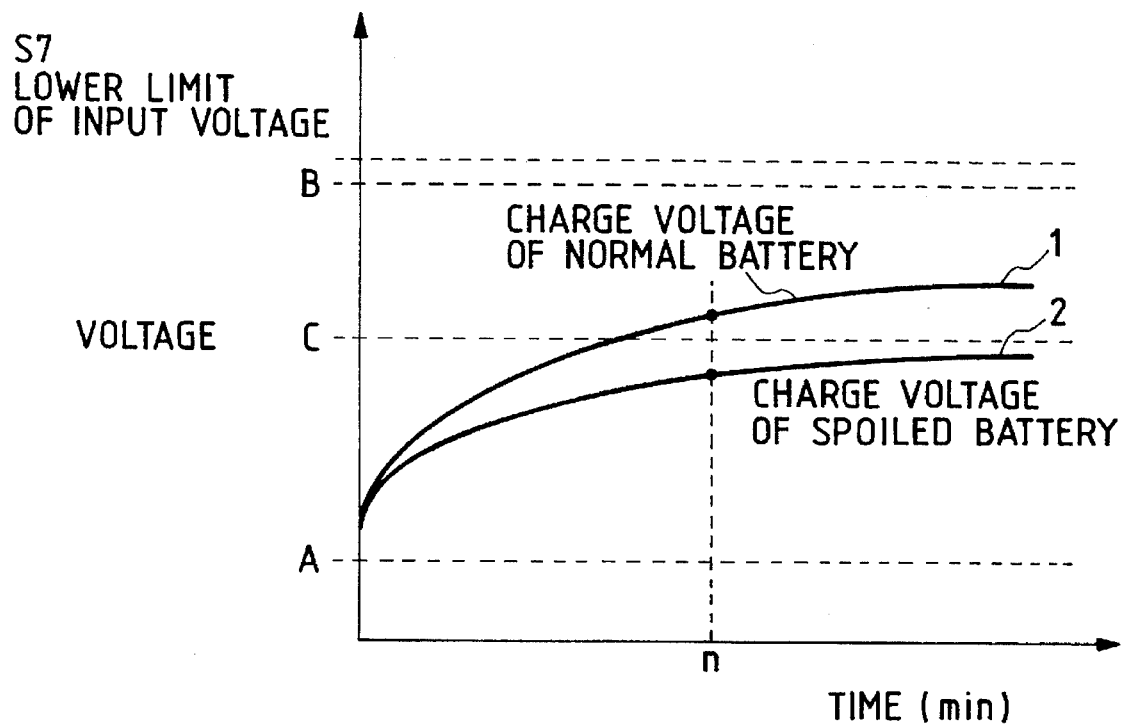
FIG. 16 is a graph for explaining a change in battery voltage from the beginning of charging of a secondary battery and a source voltage.

As shown in FIG. 16, as a result of examination of the rise state of the battery voltage in the charge process, it is found that a change (curve 1) in the charge state of a normal battery is different from a change (curve 2) in battery voltage of a consumed battery whose service life has ended. Based on this fact, a time n is set to use a prescribed value C (in this embodiment, a battery rating of 6 V) which can be discriminated in an early state from the beginning of the charge operation. The time n can be used in a range from several ten seconds to several minutes. In this embodiment, the timing at which the voltage curve changes from a steep curve to a slow curve (i.e., n=120 seconds; 2 minutes) is used.

Note that FIG. 16 also shows the above-mentioned prescribed values A and B, and the potential of 9.5 V of the AC adapter as the lower limit of the input voltage in step S7. Thereafter, the battery voltage is checked in step S12 after an elapse of the time n set in step S11. If the detected battery voltage is equal to or higher than the prescribed value C, it is determined that the battery is worthy of charge. Thus, the charge operation is continued, and steps S7 to S14 above are repeated until it is confirmed in step S15 that the predetermined charge time (in this embodiment, 10 hours) has elapsed. In step S14, since it is determined that the battery voltage is less than the prescribed value C, a message indicating "battery trouble" is displayed, and the charge operation is immediately terminated. The charge operation is performed while executing the above-mentioned fail safe steps, and is completed after an elapse of the charge time. Thus, the charged battery can achieve at least satisfactory recording.

As described above, since quick discrimination can be reliably achieved with low cost, the reliability of the charge function can be improved. Therefore, a power supply circuit which can prevent any wasteful operation time and, more particularly, can greatly reduce the recording disabled period, can be provided.

The prescribed value C is preferably set to be a value equivalent to the rating of the battery (including a value that is the rating minus about 0.5 V in the sense of a substantially equivalent value) so as to attain a further long service life of the charge function, and the predetermined period is preferably set to fall within a range of several minutes from the beginning of the charge operation, in which the normal battery voltage exceeds the reference value. This is because the charge function itself is designed to perform a stable charge operation for the rating of the battery.

Figure 17:
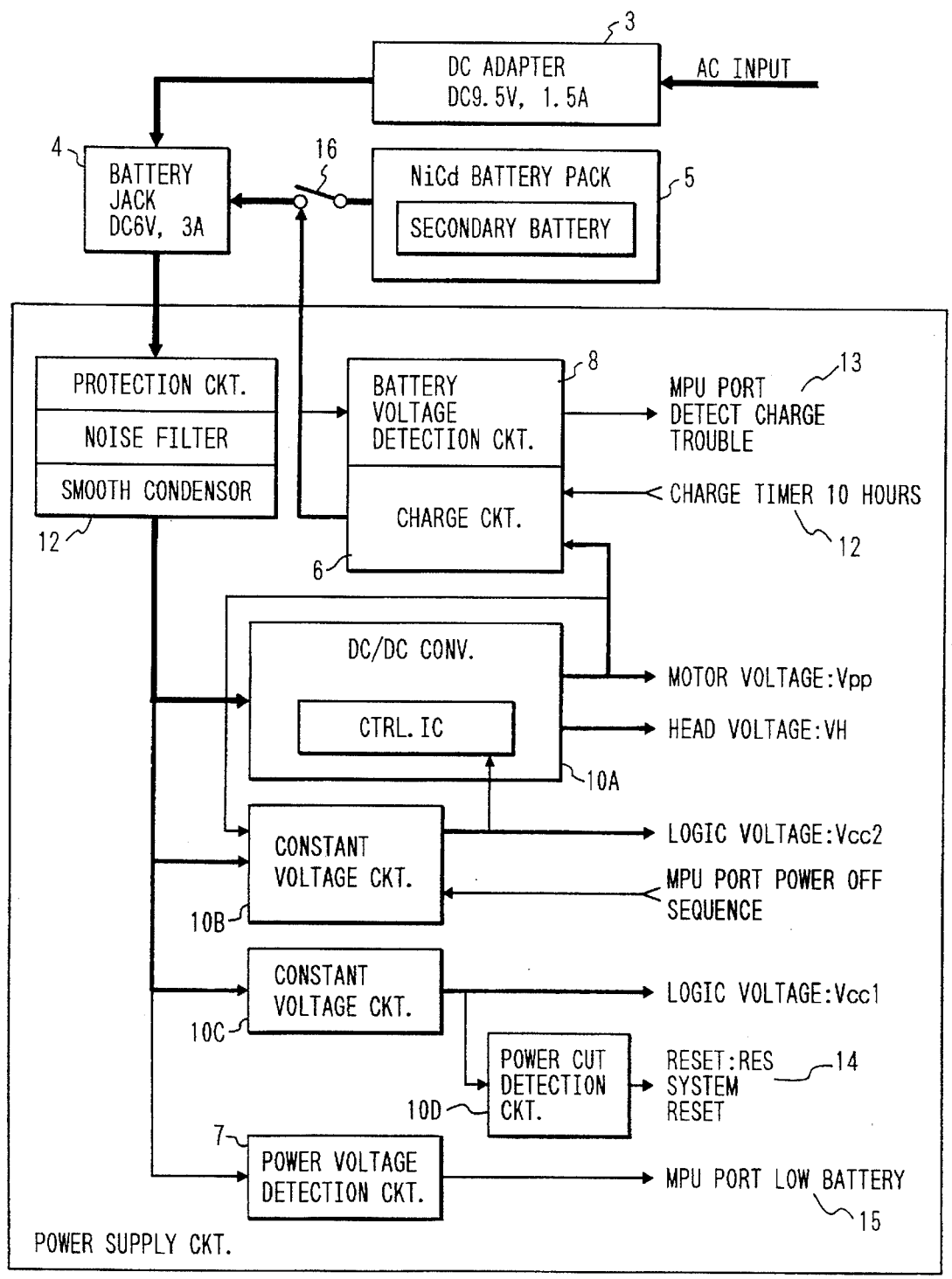
FIG. 17 is a block diagram showing the charge circuit used in the recording apparatus of the present invention.
Figure 19:
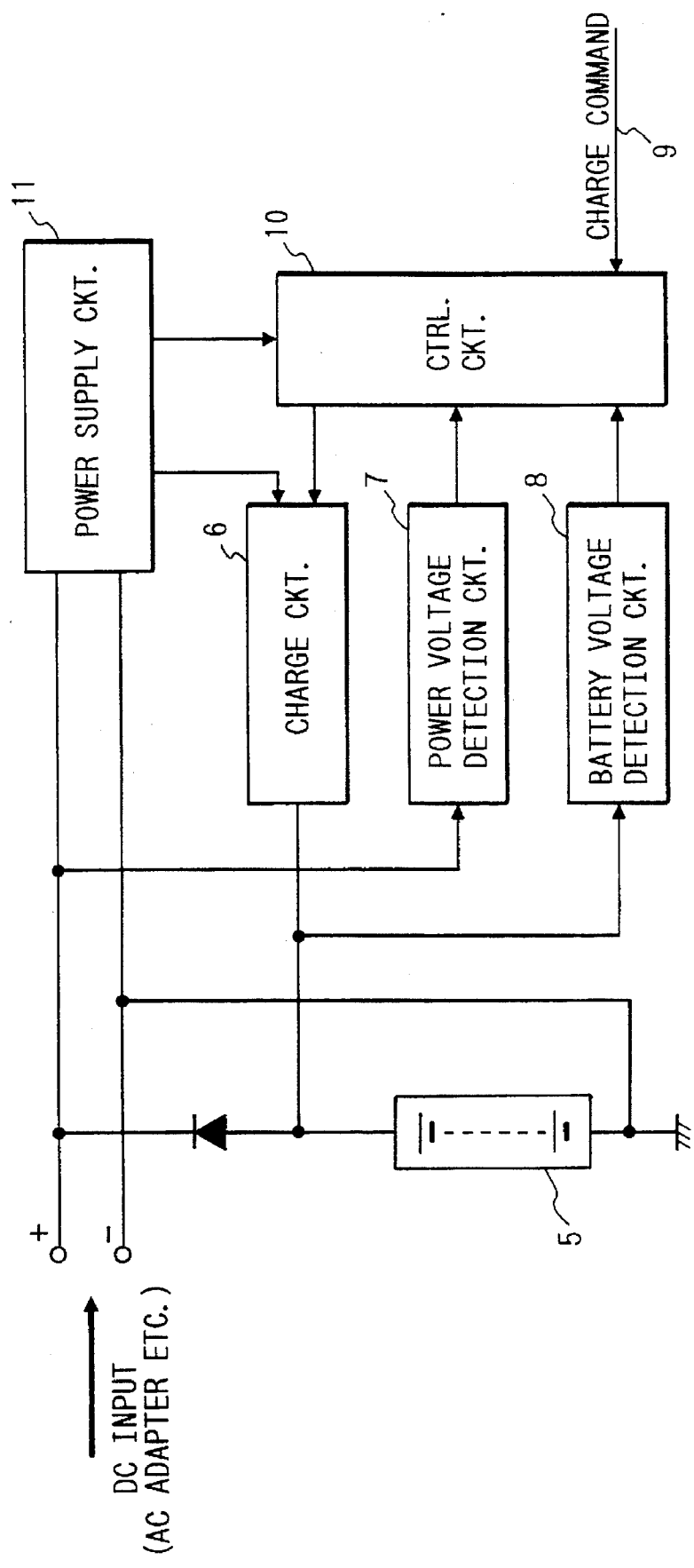
FIG. 19 is a block diagram showing the charge circuit used in the recording apparatus of the present invention.

As the block arrangement for executing the flow shown in FIG. 15, a circuit arrangement shown in FIG. 17 is used. FIG. 17 shows the circuit arrangement of the present invention, and this arrangement can be applied to various types of equipment depending on the control target of a control circuit 10. A power supply circuit 11 is connected to a wiring line to directly receive a direct current DC. The plus side of the wiring line is connectable to the plus side of a secondary battery 5 via a unidirectional diode (battery selection switch (not shown); but see FIG. 18), and the minus side of the wiring line is connected to the grounded minus side of the secondary battery 5. A charge circuit 6 is located between a contact between the plus side of the secondary battery 5 and the unidirectional diode, and the power supply circuit 11. Although not shown, the charge circuit 6 is constituted by a transistor, a current control resistor, and a temperature fuse connected in parallel with the resistor, thus realizing further cost reduction of the entire apparatus. When the above-mentioned charge command 9 is generated by an operator or by another request, the control circuit 10 which receives the command instructs the charge circuit 6 to start the charge operation. A power voltage detection circuit 7 is connected to the plus side of the above-mentioned wiring line to detect the voltage supplied to the power supply circuit 11, and supplies the detection result to the control circuit 10. A battery voltage detection circuit 8 is connected between the charge circuit 6 and the plus side of the secondary battery 5, and supplies the detection result to the control circuit 10. With this arrangement, the flow shown in FIG. 15 is executed.

An embodiment of an ink-jet recording apparatus as a recording apparatus for which the present invention is particularly effective will be briefly described below with reference to FIGS. 18 to 20B.

Figure 18:
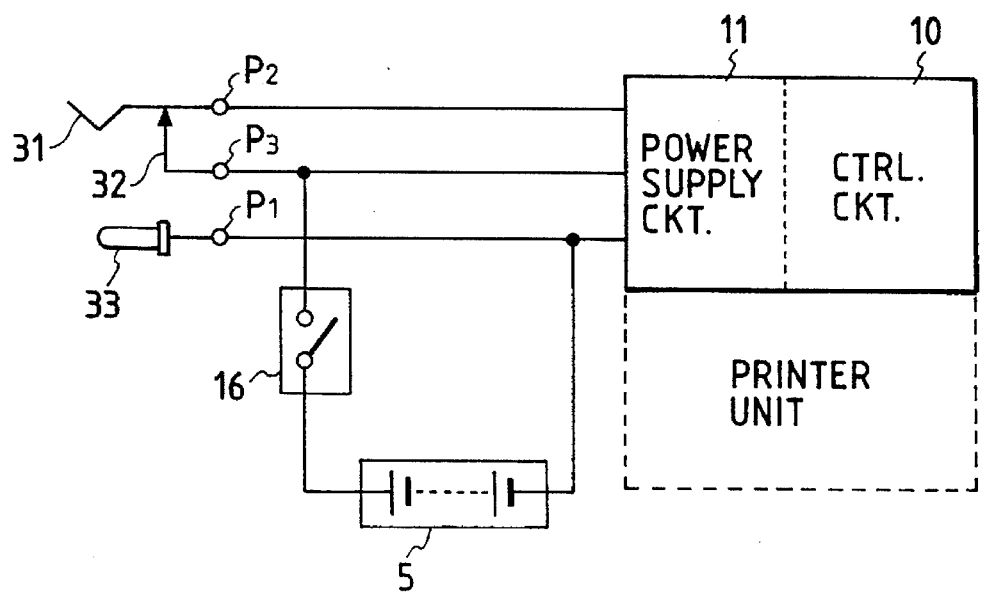
FIG. 18 is a diagram for explaining an adapter constant portion associated with charging.

As can be seen from FIG. 18, when no AC adapter (not shown) is connected, the apparatus can be driven by the secondary battery 5, and when the AC adapter is connected to a battery jack 4, a contact 31 which is elastically deformable by the AC adapter is separated from a contact 32, and electric power is supplied from the AC adapter to the power supply circuit 11. In correspondence with FIG. 19, a contact 33 is connected to a minus-side wiring line P1, the contact 32 is connected to a plus-side wiring line P3 of the secondary battery, and the contact 31 is connected to a plus-side wiring line P2 of the power supply circuit 11. Therefore, even when the power supply state changes from the connected state of the AC adapter to a state wherein an AC adapter 34 is disconnected in an ON state of a switch 16, or vice versa, a printer unit can continue its driving operation without temporarily interrupting it.

Referring to FIG. 17, the above-mentioned charge circuit 6 comprises a temperature fuse (130° C.) in correspondence with a resistor. A charge timer 12 counts the above-mentioned charge time (10 hours). The battery voltage detection circuit 8 is connected to the above-mentioned charge trouble detection means 13 as an internal element of a central control means MPU, and similarly, the power voltage detection circuit 7 is connected to a low-battery detection means (to be described later with reference to FIGS. 20A and 20B) as an internal element of the central control means MPU. A converter circuit 10A incorporates a control IC for outputting a voltage VH for the ink-jet recording head, and a motor voltage Vpp for driving the carriage, recovery unit, and recording medium feed means. The converter circuit 10A receives a supplied voltage as a voltage stabilized by processing means with a fail safe mechanism such as a protection circuit, noise filter, smoothing capacitor, and the like.

A constant voltage circuit 10B supplies a logic voltage Vcc2 to main control circuits, and stops the driving operation of the main control circuits when a main switch is turned off. A constant voltage circuit 10C supplies a logic voltage Vcc1 to a preliminary circuit MPU2 (not shown) which performs capping and initial operation of the ink-jet head so as to immediately respond to a signal input from a host apparatus. The circuit 10C supplies the driving voltage even if the OFF state. If the main switch is OFF, The constant voltage circuit 10C comprises a power cut detection circuit 10D, and generates and supplies, to the central control means MPU, a reset signal RES14 for automatically maintaining the recording head by executing capping of the recording head in response to recovery after detection of power cut. Note that the control IC receives a constant voltage from the constant voltage circuit 10B.

In this ink-jet recording apparatus, when electric power is initially supplied to the apparatus, the reset signal RES14 is supplied to the central control means MPU, and the apparatus is controlled to execute capping processing in response to this output. For this reason, when the use state of the host side changes, the reset signal RES14 is supplied to the central control means MPU to perform capping processing. In this manner, it is important to perform the above-mentioned capping processing when any trouble occurs from a steady state. It is important, in this sense, to discriminate whether or not the capping processing is performed (for example, whether or not carriage movement for capping processing is performed, or whether or not movement relative to the cap is performed in the case of a full-line ink-jet head) as the checking criterion of the charge state of the secondary battery. Note that a battery voltage which disturbs carriage movement is 5.7 V.

Figure 20B:
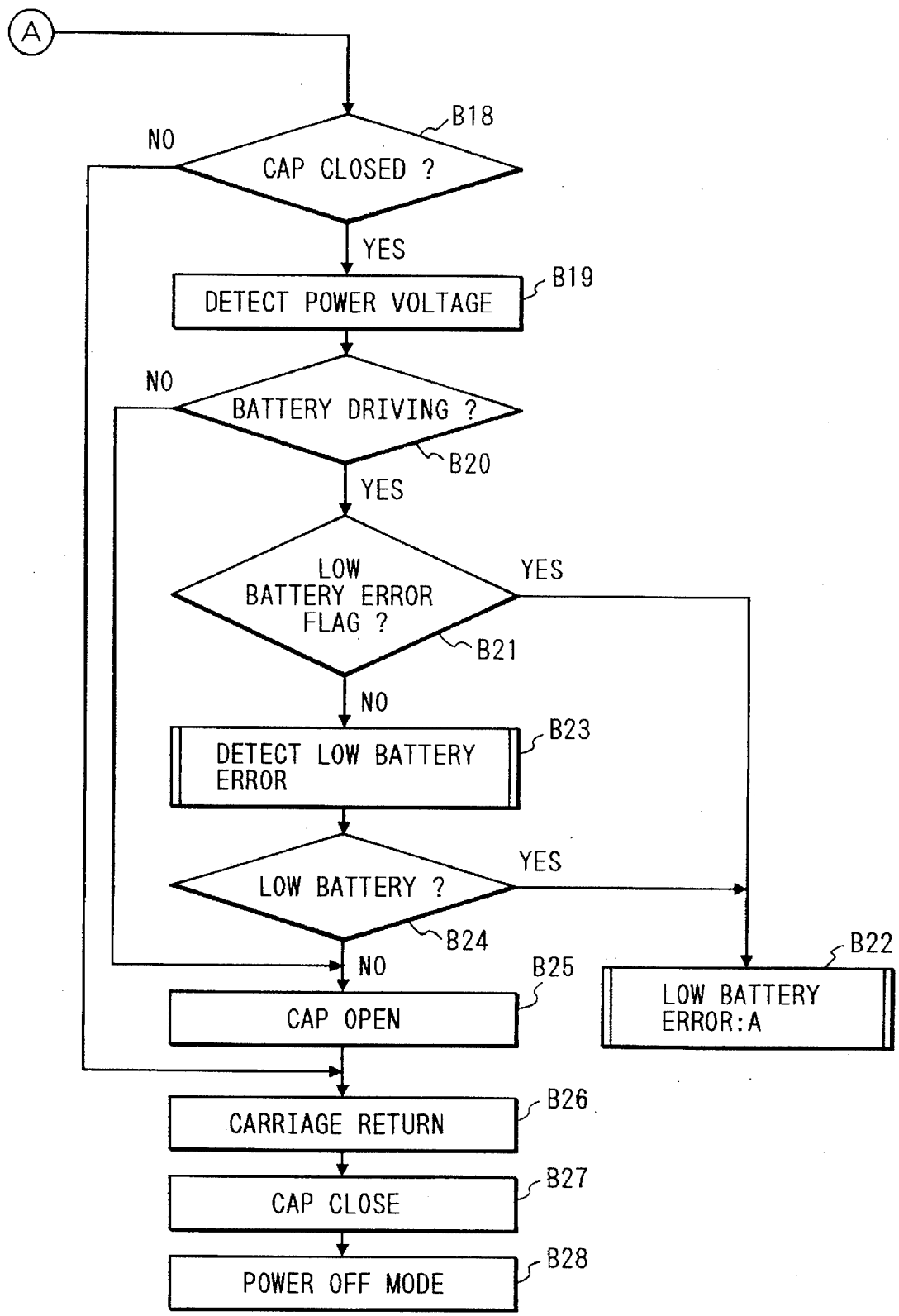
FIG. 20 which is comprised of FIGS. 20A and 20B is a flow chart showing the operation of the recording apparatus of the present invention.
Figure 21B:
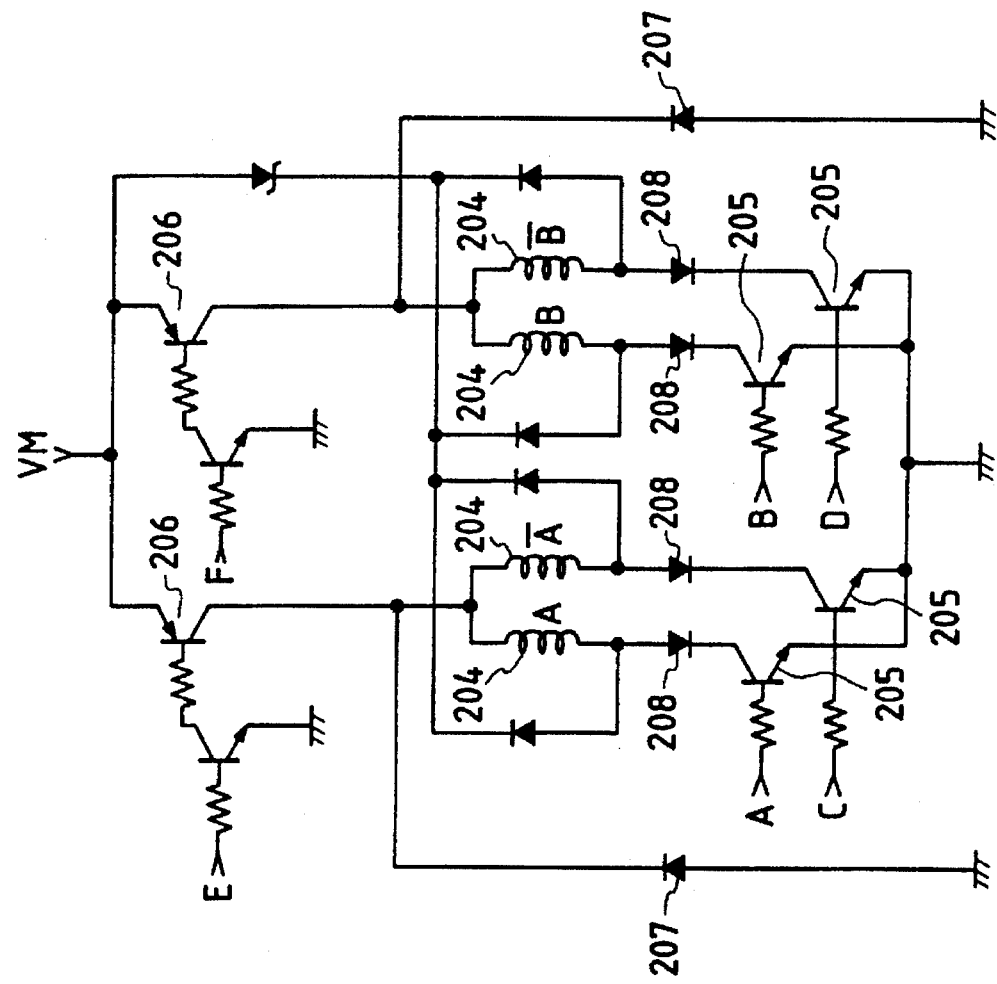
FIG. 21 is a circuit diagram showing a conventional stepping motor driving circuit.
Figure 21A:
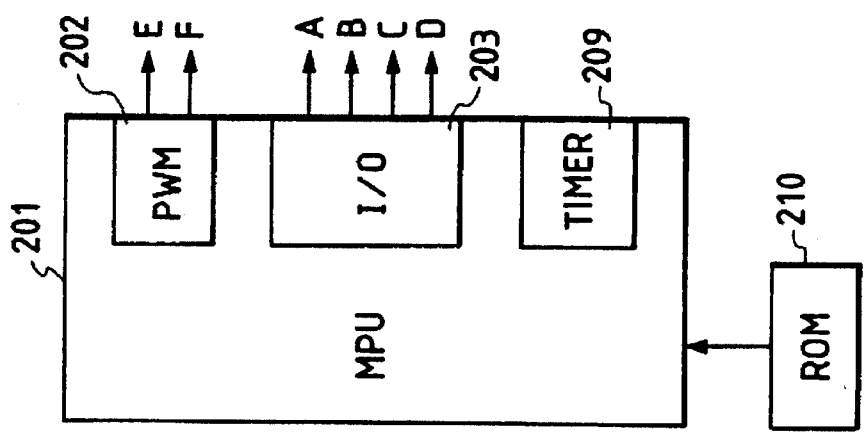

FIGS. 20A and 20B are flow charts showing an example of a power-on/power-off operation sequence of the ink-jet recording apparatus.

When an interrupt request is input to the preliminary circuit MPU2, which is enabled by the constant voltage circuit 10C, by an operation of the power switch in step B1, the circuit MPU2 performs control to perform a power-off operation of the recording apparatus if the apparatus is in the power-on state upon operation of the power switch, or vice versa.

If the operation of the power switch is detected in step B1, it is checked in step B2 if this operation corresponds to a power-on operation. If Y (YES) in step B2, the flow advances to step B3; otherwise, the flow advances to step B18.

The power-on operation will be described below. In this processing step, an adapter connection error is prevented during the charge step. However, in this embodiment, a still preferred discrimination is performed prior to the charge step.

In step B3, initialization (hardware and software) is performed using the circuit MPU2. In step B4, the power voltage is detected. If it is determined in step B5 that the apparatus is battery-driven, it is checked in step B6 if the battery can be used, as in steps S2 to S4 in FIG. 15. If it is determined that the battery cannot be used, a low battery flag is set; otherwise, the flag is not set. In step B7, this flag is discriminated. If the flag is set, low battery error processing B is executed. This processing allows an operation to connect the AC adapter, and if the AC adapter is connected within a predetermined period of time, the error is canceled and the flow advances to step B9. If the AC adapter is not connected, the power-off operation is performed, and the flow ends.

If it is determined in step B5 that the apparatus is AC-driven, if it is determined in step B7 that no flag is set, or if the error is canceled in step B8, the flow advances to step B9, and the cap of the ink-jet recording head is opened. This operation is the same as that processed upon generation of the above-mentioned reset signal.

Thereafter, in step B10, the carriage is initialized. In this operation, the carriage temporarily shifts to the recording region side, and thereafter, the recording head returns to the cap position. In step B12, the capping processing is executed again for the returned recording head, thus assuring the initial state.

The presence/absence of the above-mentioned charge signal is discriminated in step B13. If the charge signal is present, charge command processing is executed in step B14. This processing is based on the flow chart shown in FIG. 15. In this case, since the adapter has already been connected, an initial problem as to the charge step has been solved. If the charge signal is absent, the presence/absence of paper sheets is discriminated in step B15. If paper sheets are absent, a message indicating "no paper" is displayed on step B16; otherwise, an on-line recording mode is started.

On the other hand, if the flow advances to step B18, it is checked in step B18 if the recording head is closed by the cap. If N (NO) in step B18, the carriage returns (step B26), the cap is closed (step B27), and a power-off mode is started (step B28). On the other hand, if the cap is closed, the same processing as in steps B4 to B7 is executed in steps B19 to B24, and thereafter, the flow advances to step B28. However, if the apparatus is battery-driven and an error is determined in step B21 and B24, low battery error processing is executed in step B22. Unlike the processing B, this processing simply terminates all operations.

In addition to the above-mentioned, the following processing is preferably performed. Since the battery voltage changes within a range from about 2 V to 5 V depending on the environmental temperature, this variation state is preferably corrected so as not to influence the discrimination result. More specifically, in consideration of a temperature rise depending on the use state, the detection circuit or the discrimination means preferably comprises means for correcting the detection result or the reference value in correspondence with environmental conditions. This correction can be attained by increasing the detection voltage or decreasing the reference value along with the temperature rise. As another method, it is preferable to terminate the charge operation after the above-mentioned discrimination is performed a plurality of number of times, since the final decision is made after the measurement state, which varies due to the temperature rise, is stabilized. This method also includes a case wherein the apparatus temporarily determines an error, and thereafter, the above-mentioned discrimination is performed to make a final decision so as to perform re-confirmation upon exchange of a battery.

As the recording apparatus, the reference value is preferably set to be a voltage which allows the recording means to achieve recording, or a voltage which allows maintenance means for the recording head to perform its operation. The maintenance means includes capping means, cleaning means, and the like, as will be described later, but the present invention is not limited to these.

The present invention brings about excellent effects particularly in a recording head and a recording apparatus of a bubble jet system among the ink jet recording systems.

As the representative arrangement and principle of the ink-jet recording system, one practiced by use of the basic principle disclosed in, for example, U.S. Pat. Nos. 4,723,129 and 4,740,796 is preferred. The above system is applicable to either one of so-called an on-demand type and a continuous type. Particularly, in the case of the on-demand type, the system is effective because, by applying at least one driving signal, which corresponds to recording information and gives a rapid temperature rise exceeding nucleus boiling, to each of electrothermal conversion elements arranged in correspondence with a sheet or liquid channels holding liquid (ink), heat energy is generated by the electrothermal conversion element to effect film boiling on the heat acting surface of the recording head, and consequently, a bubble can be formed in the liquid (ink) in one-to-one correspondence with the driving signal. By ejecting the liquid (ink) through an ejection opening by growth and shrinkage of the bubble, at least one droplet is formed. If the driving signal is applied as a pulse signal, the growth and shrinkage of the bubble can be attained instantly and adequately to achieve ejection of the liquid (ink) with an particularly high response characteristics. As the pulse driving signal, signals disclosed in U.S. Pat. Nos. 4,463,359 and 4,345,262 are suitable. Note that further excellent recording can be performed by using the conditions described in U.S. Pat. No. 4,313,124 of the invention which relates to the temperature rise rate of the heat acting surface.

As an arrangement of the recording head, in addition to the arrangement as a combination of ejection orifices, liquid channels, and electrothermal conversion elements (linear liquid channels or right angle liquid channels) as disclosed in the above specifications, the arrangement using U.S. Pat. Nos. 4,558,333 and 4,459,600, which disclose the arrangement having a heat acting portion arranged in a flexed region, is also included in the present invention. In addition, the present invention can be effectively applied to an arrangement based on Japanese Laid-Open Patent Application No. 59-123670 which discloses an arrangement using a slit common to a plurality of electrothermal conversion elements as an ejection portion of the electrothermal conversion elements, or Japanese Laid-Open Patent Application No. 59-138461 which discloses an arrangement having an opening for absorbing a pressure wave of heat energy in correspondence with an ejection portion.

Furthermore, as a full line type recording head having a length corresponding to the width of a maximum recording medium which can be recorded by the recording apparatus, either the arrangement which satisfies the full-line length by combining a plurality of recording heads as disclosed in the above specification or an arrangement of a single recording head obtained by forming recording heads integrally can be used. With this head, the present invention can provide the above-mentioned effects more effectively.

It is preferable to add recovery means for the recording head, preliminary auxiliary means, and the like provided as an arrangement of the recording apparatus of the present invention since the effect of the present invention can be further stabilized. Examples of such means include, for the recording head, capping means, cleaning means, pressurization or suction means, and preliminary heating means using electrothermal conversion elements, another heating element, or a combination thereof. It is also effective for stable recording to execute a preliminary ejection mode which performs ejection independently of recording.

Furthermore, as a recording mode of the recording apparatus, the present invention is very effective for not only an apparatus having a recording mode using only a primary color such as black or the like, but also an apparatus having at least one of a multi-color mode using a plurality of different colors or a full-color mode achieved by color mixing, although such modes may be attained either by using an integrated recording head or by combining a plurality of recording heads.

As described above, the stepping motor driving device of the present invention using the low-pass filter and the constant current driving circuit can provide the following effects.

(1) As compared to the constant voltage driving system or the constant current driving system, the entire circuit can be rendered compact, cost can be reduced, and a motor vibration is not generated to reduce rotation noise.

(2) Furthermore, as compared to the open PWM control system, since each phase of the motor can be excited by a smooth current waveform (e.g., a sine or square curve waveform) to approximate an ideal waveform in principle, high-precision, high-speed constant rotation can be realized. Since current components which consume electric power are eliminated, wasteful power consumption can be avoided, and hence, the device of the present invention is suitable for, e.g., a battery-driven recording apparatus. In addition, a high torque can be obtained as compared to consumption power.

(3) In addition, the excitation current is not influenced by a variation in power voltage.

On the other hand, the stepping motor driving device of the present invention which uses the D/A converter and the constant current driving circuit has the above-mentioned effect (1) as compared to the constant voltage driving system or the constant current driving system, and can provide the following effects as compared to the open PWM control system.

(1) The excitation current is not influenced by a variation in power voltage.

(2) A voltage waveform for generating an excitation current can be easily set.

The recording apparatus of the present invention which uses the above-mentioned stepping motor driving device (especially, using the low-pass filter and the constant current driving circuit) has the following effects.

(1) Since high-speed, high-precision constant-speed rotation can be realized, the printing (recording) speed can be increased, and printed image nonuniformity can be eliminated.

(2) Since a high torque can be obtained, the motor can be rendered compact, and hence, the entire apparatus can be rendered compact.

(3) Since wasteful power consumption can be avoided, the apparatus of the present invention is suitably applied to a portable recording apparatus which receives electric power from a battery.

What is claimed is:

1. A stepping motor control system, comprising:

a stepping motor;

a driving circuit for driving said stepping motor, said driving circuit, in response to each supplied step driving signal, changing-over a phase of excitation current supplied to an excitation coil of said stepping motor and controlling the excitation current in accordance with an applied voltage signal;

a step driving signal generation portion for supplying the step driving signal to said driving circuit to drive said stepping motor;

a pulse signal generation portion for generating a pulse signal whose duty ratios are set a memory for storing a plurality of duty ratio data of the pulse signal;

a control portion for varying the duty ratio of the pulse signal generated by said pulse signal generation portion in accordance with a plurality of the duty ratio data stored in said memory, said control portion dividing a single step driving of said stepping motor into a plurality of sections in which the duty ratio of the pulse signal is varied in each of the plurality of sections to form a staircase-like pulse voltage level; and a low-pass filter for converting the staircase-like pulse voltage level successively output from said pulse signal generation portion into a smooth and substantially continuous applied voltage signal, said low-pass filter supplying said applied voltage signal to said driving circuit to control the driving current of said stepping motor.

2. A system according to claim 1, wherein said low-pass filter comprises a resistor inserted between said pulse signal generation portion and said driving circuit, and a capacitor arranged between a terminal, on the driving circuit side, of said resistor and ground.

3. A system according to claim 1, wherein said low-pass filter comprises an active filter using an operational amplifier.

4. A system according to claim 1, wherein said driving circuit comprises an arbitrary current value setting type constant current driving circuit which maintains a current value set in correspondence with a voltage of the voltage signal.

5. A system according to claim 4, wherein said arbitrary current value setting type constant current driving circuit comprises a comparator which receives the voltage signal at one input terminal thereof, and receives a reference voltage obtained in correspondence with a detected current value flowing through said stepping motor at the other input terminal thereof.

6. A system according to claim 5, wherein said arbitrary current value setting type constant current driving circuit comprises a gate which receives an output from said comparator at one input terminal thereof, and receives the step driving signal from said step driving signal generation portion at the other input terminal thereof.

7. A system according to claim 1, wherein said pulse signal generation portion comprises a PWM signal generation portion, said PWM signal generation portion generates a PWM signal to approximate a waveform of the voltage signal output from said low-pass filter to a sine waveform.

8. A system according to claim 1, wherein said pulse signal generation portion comprises a PWM signal generation portion, wherein said PWM signal generation portion generates a PWM signal corresponding to a duty ratio, and the PWM signal is generated to approximate a waveform of the voltage signal output from said low-pass filter to a square curve waveform.

9. A stepping motor control system comprising:
   a stepping motor;
   driving circuit for driving said stepping motor, said driving circuit, in response to each supplied step driving signal, changing-over a phase of excitation current supplied to an excitation coil of said stepping motor and controlling the excitation current in accordance with an applied voltage signal;
   a signal generation portion for generating a pulse signal whose duty ratios are set and for generating a pulse driving signal for driving said stepping motor;
   a control portion for varying the duty ratio of the pulse signal generated by said signal generating portion in accordance with a plurality of duty ratio data, said control portion dividing a single step driving of said stepping motor into a plurality of sections in which the duty ratio of the pulse signal is varied in each of the plurality of sections to form a staircase-like pulse voltage level; and
   a converting circuit for converting the staircase-like pulse voltage level successively output from said pulse signal generation portion into a smooth and substantially continuous applied voltage signal, said converting circuit supplying the applied voltage signal to said driving circuit to control the driving current of said stepping motor.

10. A system according to claim 9, wherein said converting circuit comprises a low-pass filter, and said low-pass filter comprises a resistor inserted between said signal generation portion and said driving circuit, and a capacitor arranged between a terminal, on the driving circuit side, of said resistor and ground.

11. A system according to claim 10, wherein said driving circuit comprises an arbitrary current value setting type constant current driving circuit which maintains a current value set in correspondence with a voltage of the voltage signal.

12. A stepping motor control system comprising:
   a stepping motor;
   a driving circuit for driving said stepping motor, said driving circuit, in response to each supplied step driving signal, changing-over a phase of excitation current supplied to an excitation coil of said stepping motor and controlling the excitation current in accordance with an applied voltage signal;
   a step driving signal generation portion for supplying a step driving signal to said driving circuit to drive said stepping motor;
   a D/A convertor for successively generating a voltage signal having staircase-like voltage level;
   a control portion for dividing a single step driving of said stepping motor into a plurality of sections and for causing said D/A convertor to successively generate the voltage signal having the staircase-like voltage level in the divided plural sections; and
   a converting circuit for converting the voltage signal having the staircase-like voltage level successively output by said D/A convertor into a smooth and substantially continuous applied voltage signal, said converting circuit supplying the applied voltage signal to said driving circuit to control the driving current of said stepping motor.

13. A system according to claim 12, wherein said driving circuit comprises a arbitrary current value setting type constant current driving circuit comprises a comparator which receives the voltage signal at one input terminal thereof, receives a reference voltage obtained in correspondence with a detected current value flowing through the excitation coil of said stepping motor at the other input terminal thereof, and compares the voltage signal and the reference voltage.

14. A system according to claim 13, wherein said arbitrary current value setting type constant current driving circuit comprises a gate which receives an output from said comparator at one input terminal thereof, receives a step driving signal for selecting the excitation coil of said stepping motor at the other input terminal thereof, and ON/OFF-controls the output from said comparator in correspondence with a level of the step driving signal.

15. A stepping motor control system for a recording apparatus, comprising:
   a carriage which mounts a recording head;
   a stepping motor for moving said carriage to achieve a recording scan;
   a driving circuit for driving said stepping motor, said driving circuit, in response to each supplied step driving signal, changing-over a phase of excitation current supplied to an excitation coil of said stepping motor and controlling the excitation current in accordance with an applied voltage signal;
   a signal generation portion for generating a pulse signal whose duty ratios are set and for generating a pulse driving signal for driving said stepping motor;
   a control portion for varying the duty ratio of the pulse signal generated by said signal generation portion in accordance with a plurality of the duty ratio data said control portion dividing a single step driving of said stepping motor into a plurality of sections in which the duty ratio of the pulse signal is varied in each of the plurality of sections to form a staircase-like pulse voltage level; and
   a converting circuit for converting the staircase-like pulse voltage level successively output from said pulse signal generation portion into a smooth and substantially continuous applied voltage signal, said converting circuit supplying the applied voltage signal to said driving circuit to control the driving current of said stepping motor.

16. A stepping motor control system for a recording apparatus, comprising:
   a carriage which mounts a recording head;
   a stepping motor for moving said carriage to achieve a recording scan;
   a driving circuit for driving said stepping motor, said driving circuit, in response to each supplied step driving signal, changing-over a phase of excitation current supplied to an excitation coil of said stepping motor and controlling the excitation current in accordance with applied voltage signal;

a step driving signal generation portion for supplying a step driving signal to said driving circuit to drive said stepping motor;

a D/A convertor for successively generating a voltage signal having staircase-like voltage level;

a control portion for dividing a single step driving of said stepping motor into a plurality of sections and for causing said D/A convertor to successively generate the voltage signal having the staircase-like voltage level in the divided plural sections; and a converting circuit for converting said voltage signal having the staircase-like voltage level successively output by said D/A convertor into a smooth and substantially continuous applied voltage signal, said converting circuit supplying the applied voltage signal to said driving circuit to control the driving current of said stepping motor.

* * * * *

UNITED STATES PATENT AND TRADEMARK OFFICE
CERTIFICATE OF CORRECTION

PATENT NO. : 5,625,269
DATED : April 29, 1997
INVENTOR(S) : TETSUHITO IKEDA

It is certified that error appears in the above-identified patent and that said Letters Patent is hereby corrected as shown below:

ON COVER PAGE:

At [56] Under "U.S. PATENT DOCUMENTS":

Line 6, "Boilat" should read --Boillat--.

COLUMN 1:
Line 49, "is" should be deleted.
Line 50, "to" should be deleted.

COLUMN 2:
Line 50, "1/4 the" should read --1/4 of the--.
Line 64, "system" should read --system,--

COLUMN 8:
Line 31, "steeper" should read --steep--.

COLUMN 11:
Line 35, "member 1100" should read --member 1100,--.

COLUMN 15:
Line 66, "Supply" should read --supply--.

UNITED STATES PATENT AND TRADEMARK OFFICE
CERTIFICATE OF CORRECTION

PATENT NO. : 5,625,269
DATED : April 29, 1997
INVENTOR(S) : TETSUHITO IKEDA

It is certified that error appears in the above-identified patent and that said Letters Patent is hereby corrected as shown below:

COLUMN 20:
    Line 10, "number of" should be deleted.
    Line 47, "an" should be deleted.
    Line 59, "the" should read --an--.

COLUMN 22:
    Line 25, "set" should read --set;--

COLUMN 24:
    Line 12, "a" should read --an--.
    Line 13, "comprises" should read --comprising--.
    Line 45, "data" should read --data,--.

Signed and Sealed this

Ninth Day of December, 1997

Attest:

*Attesting Officer*

BRUCE LEHMAN
*Commissioner of Patents and Trademarks*